United States Patent
Shimizu et al.

(10) Patent No.: US 7,494,611 B2
(45) Date of Patent: Feb. 24, 2009

(54) CELLULOSE ESTER FILM, CELLULOSE ESTER DOPE, PROTECTIVE FILM OF POLARIZING PLATE AND POLARIZING PLATE

(75) Inventors: Kunio Shimizu, Hino (JP); Toru Kobayashi, Hino (JP)

(73) Assignee: Konica Corporation, Tokyo (JP)

( * ) Notice: Subject to any disclaimer, the term of this patent is extended or adjusted under 35 U.S.C. 154(b) by 477 days.

(21) Appl. No.: 11/240,601

(22) Filed: Oct. 3, 2005

(65) Prior Publication Data

US 2006/0029750 A1 Feb. 9, 2006

Related U.S. Application Data

(62) Division of application No. 09/900,961, filed on Jul. 10, 2001, now Pat. No. 6,974,608.

(30) Foreign Application Priority Data

Jul. 11, 2000 (JP) ............... 2000/209812

(51) Int. Cl.
*B29C 39/14* (2006.01)
(52) U.S. Cl. ................ 264/216; 264/217; 264/234
(58) Field of Classification Search ................ 264/216, 264/217, 234
See application file for complete search history.

(56) References Cited

U.S. PATENT DOCUMENTS

| 2,402,942 | A |   | 7/1946  | Bludworth |
|-----------|---|---|---------|-----------|
| 2,552,820 | A |   | 5/1951  | Seymour et al. |
| 3,184,421 | A |   | 5/1965  | Caldwell et al. |
| 3,277,032 | A |   | 10/1966 | Caldwell |
| 4,023,977 | A |   | 5/1977  | Mercurio et al. |
| 4,181,766 | A | * | 1/1980  | Williams et al. ............ 428/216 |
| 4,715,686 | A |   | 12/1987 | Iwashita et al. |
| 6,503,581 | B1 |  | 1/2003  | Shibue et al. |
| 6,512,562 | B1 |  | 1/2003  | Kobayashi et al. |
| 6,582,645 | B2 | * | 6/2003  | Takeda .................... 264/217 X |
| 2002/0102368 | A1 | * | 8/2002 | Ono et al. .................. 428/1.33 |

OTHER PUBLICATIONS

Mark, Encyclopedia of Polymer Science and Engineering, 1985, p. 183.

* cited by examiner

*Primary Examiner*—Leo B Tentoni
(74) *Attorney, Agent, or Firm*—Finnegan, Henderson, Garrett & Dunner, L.L.P.

(57) ABSTRACT

Disclosed is a cellulose ester film comprising a polymer prepared by polymerizing at least one ethylenically unsaturated monomer selected from vinyl esters, vinyl esters having a functional group, acrylic esters, and acrylic esters having a functional group, wherein the polymer has a weight average molecular weight of not more than 5,000.

12 Claims, No Drawings

CELLULOSE ESTER FILM, CELLULOSE ESTER DOPE, PROTECTIVE FILM OF POLARIZING PLATE AND POLARIZING PLATE

This application is a division of application Ser. No. 09/900,961, filed on Jul. 10, 2001, now U.S. Pat. No. 6,974,608 and claims the benefit of Japanese Application No. 2000-209812, filed on Jul. 11, 2000, which is incorporated herein by reference.

FIELD OF THE INVENTION

The present invention relates to a cellulose ester film useful for a protective film of polarizing plate and a polarizing plate used in a liquid crystal display.

BACKGROUND OF THE INVENTION

A cellulose ester film has been used as a support of a silver halide photographic light sensitive material. Recently, the cellulose ester film has been also used as a protective film of a polarizing plate used in a liquid crystal display. However, a property, which has not been required in the silver halide photographic light sensitive material, is required in the protective film of the polarizing plate. A plasticizer is contained in a cellulose ester film used for a protective film of a polarizing plate as in a support of a silver halide photographic light sensitive material so that the cellulose ester film has flexibility or water resistance.

Recently, development has been made regarding decrease in thickness and weight of an information device with a liquid crystal display such as a note board type personal computer, a car navigation system, a cell phone or a game device. In parallel with this development, a protective film of a polarizing plate has been eagerly sought to be increasingly thinner. Accordingly, the protective film of the polarizing plate is required to be far thinner than the cellulose ester film support of the silver halide photographic light sensitive material. However, a decrease in thickness of the film increases moisture vapor permeability, which lowers performance of a liquid crystal display employing the film at high humidity, particularly at high humidity and high temperature.

Further, a simple decrease in thickness of the cellulose ester film increases moisture vapor permeability, minimizes water resistance, and occasionally deteriorates a polarizing film or an adhesive used to adhere the polarizing film to a cellulose ester film (as a protective film of a polarizing plate). In order to compensate for the decrease in thickness, an addition amount of a plasticizer in the film is ordinarily increased. However, it has been found that a simple increase of the plasticizer addition amount causes precipitations on the film surface, and produces new problems in addition to those occurring in the silver halide photographic light sensitive materials. There is a problem that the increased addition amount of plasticizers lowers a glass transition point (hereinafter referred to also as Tg) of the cellulose ester film to soften the cellulose ester film, resulting in a lowering of dimensional stability of the film, (for example, increase of rate of shrinkage, coefficient of hygroscopic expansion or coefficient of thermal expansion).

After a cellulose ester dope containing a plasticizer is cast on a moving endless metal support to form a film web employing a solution casting film forming method, the web is dried. During drying, the plasticizer moves in the thickness direction of the web, or is evaporated and condensed on the walls of the dryer to form plasticizer droplets. The droplets result in contamination of the rollers and web.

The weight of the cellulose ester film decreases at high humidity and high temperature due to volatilization or precipitation of additives such as plasticizers. A property that additives such as plasticizers are retained in the cellulose ester film is referred to as a retention property. Conventional cellulose ester films are low in the retention property, which lowers performance of a liquid crystal display employing the cellulose ester film.

In order to solve the above problems, there are proposed techniques that polymers such as polyesters, polyesterethers, or polyurethanethers are added as polymer plasticizers or together with low molecular weight plasticizers, to the cellulose ester film, which are disclosed for example, in Japanese Patent Publication Nos. 47-760 and 43-16305, Japanese Patent O.P.I. Publication Nos. 5-197073, and U.S. Pat. Nos. 3,054,673 and 3,277,031. There is a proposal in U.S. Pat. No. 3,277,032 that methyl acrylate is polymerized in the cellulose ester, and the resulting polymethyl acrylate is blended with the cellulose ester. However, a problem has been found that the addition of the polymer plasticizers causes phase separation in the cellulose ester dope, in the web during drying in cellulose ester film manufacture or in the cellulose ester film itself, which results in lowered film transparency, increased moisture transmittance, non-uniform film shrinkage, or deterioration of rate of shrinkage.

SUMMARY OF THE INVENTION

The present invention has been made in order to solve the above problems. A first objective of the invention is to provide a cellulose ester film difficult to produce precipitation or volatilization of the additives during its manufacture. A second objective of the invention is to provide a protective film of a polarizing plate, which is low in moisture vapor permeability, low in elongation and shrinkage even at high humidity and high temperature, and is excellent in the retention property. A third objective of the invention is to provide a polarizing plate with high quality which does not deteriorate a polarizing film even at high humidity and high temperature.

The above problems in the invention can be solved by the following constitutions:

1. A cellulose ester film comprising a polymer prepared by polymerizing at least one ethylenically unsaturated monomer selected from the group consisting of vinyl esters, vinyl esters having a functional group, acrylic esters, and acrylic esters having a functional group, the polymer having a weight average molecular weight of not more than 5,000.

2. The cellulose ester film of item 1 above, wherein the polymer contains an alkyl acrylate monomer in an amount of not less than 30 weight % or an alkyl methacrylate monomer in an amount of not less than 30 weight %.

3. The cellulose ester film of item 2 above, wherein the polymer contains a methyl acrylate monomer in an amount of not less than 30 weight %.

4. The cellulose ester film of item 1 above, wherein the polymer contains a water solubilizing group.

5. The cellulose ester film of item 4 above, wherein the water solubilizing group is a hydroxyl group.

6. The cellulose ester film of item 1 above, wherein the molecular weight of the functional group of the vinyl esters having a functional group or the acrylic esters having a functional group is from 10 to 150.

7. The cellulose ester film of item 1 above, wherein the content of said polymer in the cellulose ester film is 0.5 to 30 weight % based on the cellulose ester film.

8. The cellulose ester film of item 1 above, wherein the rate of mass change of the cellulose ester film is not more than 2%, the rate of mass change being represented by the following formula:

Rate of mass change (%)=($|y-z|/y$)×100 wherein y is the weight of the cellulose ester film measured at 23±3° C. and at 55±3% RH, and z is the weight of the cellulose ester film measured at 23±3° C. and at 55±3% RH after the film has been stored at 80±3° C. and at 90±3% RH for 48 hours and further stored at 23±3° C. and at 55±3% RH for 24 hours.

9. The cellulose ester film of item 1 above, wherein the moisture vapor transmittance of the cellulose ester film with a thickness of 40 μm is not more than 250 g/m²·24 h at 80±5° C. and at 90±5% RH.

10. The cellulose ester film of item 1 above, wherein the film further contains fine particles.

11. The cellulose ester film of item 1 above, wherein the thickness of the cellulose ester film is 30 to 150 μm.

12. The cellulose ester film of item 1 above, wherein the cellulose ester film is a film for use in a liquid crystal display.

13. The cellulose ester film of item 12 above, wherein the cellulose ester film is a film for use in a protective film of a polarizing plate.

14. A cellulose ester dope comprising a polymer prepared by polymerizing at least one ethylenically unsaturated monomer selected from the group consisting of vinyl esters, vinyl esters having a functional group, acrylic esters, and acrylic esters having a functional group, the polymer having a weight average molecular weight of not more than 5,000, wherein the dope is used for preparing the cellulose ester film of item 1 above according to a solution casting film forming method.

15. A polarizing plate comprising a first protective film, a polarizing film and a second protective film, wherein at least one of the first protective film and the second protective film is the cellulose ester film of item 1 above.

16. A liquid crystal display comprising a first polarizing plate, a second polarizing plate, and a liquid crystal cell provided between the first and second polarizing plates, the second polarizing plate being arranged on the viewer side of the display, wherein the first polarizing plate has a first film, a second film and a first polarizing film between the first and second films so that the second film is provided on the first polarizing film on the liquid crystal cell side, the second polarizing plate has a third film, a fourth film and a second polarizing film between the third and fourth films so that the third film is provided on the second polarizing film on the liquid crystal cell side, and at least one of the first, second, third and fourth films is the cellulose ester film of item 1 above.

17. A method for preparing a cellulose ester film, the method comprising the steps of a) casting the cellulose ester dope of item 14 on a metal support to form a cellulose ester web, b) peeling the web from the metal support, and c) drying the peeled web to obtain a cellulose ester film.

21. A cellulose ester film, which is prepared from a dope containing a cellulose ester, a polymer and an organic solvent according to a solution casting film forming method, wherein the polymer is obtained by polymerizing an ethylenically unsaturated monomer and has a weight average molecular weight of 500 to less than 10,000.

22. The cellulose ester film of item 21 above, wherein the polymer has a hydroxyl group in at least one of the ends of the polymer main chain.

23. A cellulose ester film, which is prepared from a dope containing a cellulose ester, an acryl polymer and an organic solvent according to a solution casting film forming method, wherein the acryl polymer has a weight average molecular weight of 500 to less than 10,000.

24. The cellulose ester film of item 23 above, wherein the acryl polymer contains not less than 30 weight % of a methyl acrylate monomer unit.

25. The cellulose ester film of item 23 above, wherein the acryl polymer contains not less than 40 weight % of a methyl methacrylate monomer unit.

26. The cellulose ester film of any one of items 23 to 25 above, wherein the acryl polymer has a hydroxyl group in at least one of the ends of the polymer main chain.

27. The cellulose ester film of any one of items 23 to 26 above, wherein the acryl polymer has a weight average molecular weight of 500 to 5,000.

28. A cellulose ester film, which is prepared from a dope containing a cellulose ester, an acryl polymer having an aromatic ring group in the side chain and an organic solvent according to a solution casting film forming method, wherein the acryl polymer having an aromatic ring group in the side chain has a weight average molecular weight of 500 to less than 10,000.

29. The cellulose ester film of item 28 above, wherein the acryl polymer having an aromatic ring group in the side chain contains 20 to 40 weight % of an acrylic ester monomer unit having an aromatic ring group, and 50 to 80 weight % of a methyl acrylate monomer unit or a methyl methacrylate monomer unit.

30. The cellulose ester film of item 28 or 29 above, wherein the acryl polymer having an aromatic ring group in the side chain has a weight average molecular weight of 500 to 5,000.

31. The cellulose ester film of any one of items 28 to 30 above, wherein the acryl polymer having an aromatic ring group in the side chain has a hydroxyl group in at least one of the ends of the polymer main chain.

32. A cellulose ester film, which is prepared from a dope containing a cellulose ester, an acryl polymer having a cyclohexyl group in the side chain and an organic solvent according to a solution casting film forming method, wherein the acryl polymer having a cyclohexyl group has a weight average molecular weight of 500 to less than 10,000.

33. The cellulose ester film of item 32 above, wherein the acryl polymer having a cyclohexyl group in the side chain contains 20 to 40 weight % of an acrylic ester monomer unit having a cyclohexyl group, and 50 to 80 weight % of a methyl acrylate monomer unit or a methyl methacrylate monomer unit.

34. The cellulose ester film of item 32 or 33 above, wherein the acryl polymer having a cyclohexyl group in the side chain has a weight average molecular weight of 500 to 5,000.

35. The cellulose ester film of any one of items 32 to 34 above, wherein the acryl polymer having a cyclohexyl group in the side chain has a hydroxyl group in at least one of the ends of the polymer main chain.

36. The cellulose ester film of any one of items 21 to 35 above, wherein the film with a thickness of 10 to 60 μm has a moisture vapor transmittance of not more than 250 g/m²·24 h at 80±5° C. and 90±5% RH.

37. The cellulose ester film of any one of items 21 to 36 above, wherein the rate of mass change of the cellulose ester film is not more than 2 weight %, the rate of mass change being represented by the following formula:

Rate of mass change (weight %)=($|y-z|/y$)×100 wherein y is the weight of the cellulose ester film measured at 23±3° C. and at 55±3% RH, and z is the weight of the cellulose ester film measured after the film has been stored at 80±3° C. and at 90±3% RH for 48 hours and further stored at 23±3° C. and at 55±3% RH for 24 hours.

38. A protective film of a polarizing plate, wherein the protective film is a film prepared by saponifying the surface of the cellulose ester film of any one of items 21 to 37 above.

39. A polarizing plate wherein the protective film of item 18 above is laminated onto at least one surface of a polarizing film.

41. A cellulose ester dope for preparing a cellulose ester film according to a solution casting film forming method, wherein the dope contains an ethylenically unsaturated monomer and/or an ethylenically unsaturated monomer having a functional group and a photopolymerization initiator.

42. The cellulose ester dope of item 41 above, wherein the ethylenically unsaturated monomer is a vinyl ester.

43. The cellulose ester dope of item 41 or 42 above, wherein the ethylenically unsaturated monomer has 2 to 3 ethylenically unsaturated groups.

44. The cellulose ester dope of any one of items 41 to 43 above, wherein the functional group is a UV absorbing group or an antistatic group.

45. A cellulose ester dope for preparing a cellulose ester film according to a solution casting film forming method, wherein the dope contains a compound having an epoxy group and/or a compound having an epoxy group and a UV absorbing group, and a photopolymerization initiator.

46. The cellulose ester dope of any one of items 41 to 45 above, wherein the dope further contains fine particles.

47. The cellulose ester dope of item 46 above, wherein the fine particles are comprised of silicon oxides having a methyl group on the surface.

48. A cellulose ester dope for preparing a cellulose ester film according to a solution casting film forming method, wherein the dope contains a polymer prepared by polymerizing an ethylenically unsaturated monomer selected from vinyl esters and acrylic esters and/or an ethylenically unsaturated monomer selected from vinyl esters and acrylic esters each having a functional group.

49. The cellulose ester dope of item 48 above, wherein the functional group is a UV absorbing group or an antistatic group.

50. The cellulose ester dope of item 48 or 49 above, wherein the dope further contains fine particles.

51. The cellulose ester dope of item 50 above, wherein the fine particles are comprised of silicon oxides having a methyl group on the surface.

52. A method for preparing a cellulose ester film, the method comprising the steps of a) casting the dope of any one of items 41 to 47 above on a moving endless metal support in a solution casting device to form a web, and b) drying the web in a drying device, wherein the web is irradiated with a UV light during from the beginning of the casting till the completion of the drying.

53. The method of item 52 above, comprising the steps of a) casting the dope on the moving endless metal support to form a web, and b) peeling the web from the metal support, wherein the web is irradiated with a UV light during from the beginning of the casting till the peeling.

54. A method for preparing a cellulose ester film, wherein the method comprises the step of casting the dope of any one of items 48 to 51 according to a solution casting film forming method.

55. A cellulose ester film, wherein the cellulose ester film is prepared according to the method described in any one of items 52 to 54 above.

56. A polarizing plate employing the cellulose ester film of item 55 above.

DETAILED DESCRIPTION OF THE INVENTION

The invention will be explained in detail below.

The cellulose ester film of the invention comprises a polymer (hereinafter referred to also as the polymer in the invention) prepared by polymerizing at least one ethylenically unsaturated monomer selected from vinyl esters, vinyl esters having a functional group, acrylic esters, and acrylic esters having a functional group, wherein the polymer has a weight average molecular weight of not more than 5,000. The weight average molecular weight of the polymer in the invention is preferably 100 to 5000, more preferably 100 to less than 2000, still more preferably 500 to less than 2000, still further more preferably 700 to less than 2000, and most preferably 1000 to 1500. The polymer in the invention may contain a monomer other than the ethylenically unsaturated monomer selected from vinyl esters, vinyl esters having a functional group, acrylic esters, and acrylic esters having a functional group. The polymer in the invention preferably contains an alkyl acrylate monomer in an amount of preferably not less than 30 weight %, more preferably not less than 50 weight %, and still more preferably not less than 80 weight % or an alkyl methacrylate monomer in an amount of preferably not less than 30 weight %, more preferably not less than 50 weight %, and still more preferably not less than 80 weight %. The alkyl acrylate monomer is preferably a methyl acrylate monomer. The polymer in the invention preferably contains a water solubilising group. The water solubilising group is preferably a hydroxy group. It is preferred that at least one of the main chain ends of the polymer in the invention has a water solubilising group, preferably a hydroxyl group. The polymer in the invention may have a UV absorption property or an antistatic property by incorporating an UV absorbing group or an antistatic group in its chemical structure. When the polymer in the invention functions as a plasticizer without having a UV absorption property or an antistatic property, the functional group of the vinyl esters having a functional group or the acrylic esters having a functional group each constituting the polymer has a molecular weight of preferably from 10 to 150. The functional group is preferably a hydroxyl group, a carboxyl group, an amino group, a hydroxyphenyl group or a carboxyphenyl group.

The content of the polymer in the invention in the cellulose ester film of the invention is preferably 0.5 to 30 weight %, and more preferably 5 to 30 weight % based on the cellulose ester film.

In the cellulose ester film of the invention, the rate of mass change of the cellulose ester film is preferably not more than 2 weight %, the rate of mass change being represented by the following formula:

$$\text{Rate of mass change (weight \%)} = (|y-z|/y) \times 100$$

wherein y is the weight of the cellulose ester film measured at 23±3° C. and at 55±3% RH, and z is the weight of the cellulose ester film measured after the film has been stored at 80±3° C. and at 90±3% RH for 48 hours and then stored at 23±3° C. and at 55±3% RH for 24 hours. The moisture vapor transmittance of the cellulose ester film with a thickness of 40 µm is preferably not more than 250 g/m²·24 h at 80±5° C. and at 90±5% RH.

The cellulose ester film of the invention preferably contains fine particles. The fine particles are preferably silicon oxide particles having a methyl group on its surface. The cellulose ester film may contain a photopolymerization initiator. For example, the cellulose ester film prepared by photopolymerizing a cellulose ester dope containing a monomer and a photopolymerization initiator may contain a photopolymerization initiator. The thickness of the cellulose ester film is preferably from 30 to 150 μm, and more preferably from 35 to 85 μm.

The cellulose ester film is preferably a film for a liquid crystal display, more preferably a film for use in a protective film of a polarizing plate. The cellulose ester film may be used for a phase difference film, a reflection plate, a viewing angle increasing film, an anti-glare film, a non-reflective film, or an antistatic film.

The polarizing plate of the invention comprises a first protective film, a polarizing film and a second protective film, wherein at least one of the first protective film and the second protective film is the cellulose ester film of the invention.

The liquid crystal display of the invention comprises a first polarizing plate, a second polarizing plate, and a liquid crystal cell provided between the first and second polarizing plates, the second polarizing plate being arranged on the viewer side of the display, wherein the first polarizing plate has a first film, a second film and a first polarizing film between the first and second films so that the second film is provided on the first polarizing film on the liquid crystal cell side, the second polarizing plate has a third film, a fourth film and a second polarizing film between the third and fourth films so that the third film is provided on the second polarizing film on the liquid crystal cell side, and at least one of the first, second, third and fourth films is the cellulose ester film of the invention.

Next, a cellulose ester film manufactured according to a solution casting film forming method in the invention will be explained in detail below.

The cellulose ester in the invention has an acyl substitution degree of 2.5 to 3.0, preferably 2.5 to 2.9, and the acyl is at least one selected from an acetyl group, a propionyl group and a butyryl group. Examples of the cellulose ester include cellulose triacetate, cellulose acetate propionate, cellulose acetate butyrate, cellulose propionate, cellulose butyrate and cellulose acetate propionate butyrate. In the invention, cellulose triacetate, cellulose acetate propionate, or cellulose acetate butyrate is preferable. When the cellulose ester contains an acetyl group, the acetyl substitution degree is preferably not less than 1.4 in view of maintaining mechanical properties. Raw materials for preparing the cellulose ester are not limited, and include cotton lint, tree pulp and kenaf. These raw materials may be used in combination. It is preferable in higher productive efficiency that the cellulose ester synthesized from cotton lint, which provides good separation of the film from a belt or drum on which the film is formed, is used in a larger amount. The cellulose ester containing a cellulose ester synthesized from cotton lint in an amount of not less than 60 weight % provides good peeling ability. Accordingly, the content of the cellulose ester synthesized from cotton lint in the cellulose ester film is preferably not less than 60 weight %, more preferably not less than 85 weight %, and most preferably 100 weight %. A synthetic method of the cellulose ester is not limited, but it can be synthesized, for example, according to a method disclosed in Japanese Patent O.P.I. Publication Nos. 10-45804. The acyl substitution degree of the cellulose ester can be measured according to ASTM-D817-96. The number average molecular weight of the cellulose ester is preferably 70,000 to 300,000, and more preferably 80,000 to 200,000, in providing good mechanical strength as a protective film of a polarizing plate.

The cellulose ester dope is prepared by dissolving a cellulose ester in an organic solvent (a good solvent) capable of dissolving it. The dissolution process is one in which cellulose ester flakes are dissolved, while stirring, in organic solvents mainly comprised of good solvents for the flakes, employing a dissolution vessel, and thereby a cellulose ester dope is prepared. In order to carry out said dissolution, there are various methods such as a method in which dissolution is carried out at a normal atmospheric pressure, a method in which dissolution is carried out at a temperature lower than the boiling point of the main solvent, a method in which dissolution is carried out at a temperature higher than the boiling point of the main solvent under increased pressure, a cooling dissolution method in which dissolution is carried out at a low temperature, as described in Japanese Patent O.P.I. Publication Nos. 9-95544, 9-95557 and 9-95538, and a method in which dissolution is carried out at a high pressure as described in Japanese Patent O.P.I. Publication No. 11-21379. The resultant dope is filtered employing filter materials, is then defoamed, and is subsequently pumped to the next process. The cellulose ester content of the dope is preferably 10 to 35 weight %.

The cellulose ester dope used in the cellulose ester film of the invention comprises, as main components, a cellulose ester, the polymer in the invention, and an organic solvent.

The polymer in the invention has a weight average molecular weight of 500 to 10000, which provides excellent compatibility with the cellulose ester without evaporation. Particularly an acryl polymer (including an acryl polymer having an aromatic ring group or a cyclohexyl group) having a weight average molecular weight of 500 to 10000 provides a cellulose ester film with excellent transparency and extremely low moisture vapor transmittance. A protective film of a polarizing plate employing the acryl polymer provides excellent performance.

Examples of the monomer unit constituting the polymer in the invention include the following, but the invention is not limited thereto.

1) (meth)acrylic esters such as methyl (meth)acrylate, ethyl (meth)acrylate, propyl (i- or n-) (meth)acrylate, butyl (n-, i-, s- or t-) (meth)acrylate, pentyl (n-, i-, or s-) (meth) acrylate, hexyl (n-, or i-) (meth)acrylate, heptyl (n-, or i-) (meth)acrylate, octyl (n-, or i-) (meth)acrylate, nonyl (n-, or i-) (meth)acrylate, myristyl (n-, or i-) (meth)acrylate, cyclohexyl (meth)acrylate, 2-ethylhexyl (meth)acrylate, 2-hydroxyethyl (meth)acrylate, 2-hydroxypropyl (meth)acrylate, 3-hydroxypropyl (meth)acrylate, 4-hydroxybutyl (meth) acrylate, 2-hydroxybutyl (meth)acrylate, benzyl (meth)acrylate, phenetyl (meth)acrylate, and (meth)acrylic acid ε-caprolactone;

2) vinyl esters such as vinyl acetate, vinyl propionate, vinyl butyrate, vinyl valerate, vinyl pivalate, vinyl caproate, vinyl caprate, vinyl laurate, vinyl myristate, vinyl palmitate, vinyl stearate, vinyl cyclohexanecarboxylate, vinyl octanoate, vinyl methacrylate, vinyl crotonate, vinyl sorbate, vinyl benzoate, and vinyl cinnamate;

3) unsaturated acids such as acrylic acid, methacrylic acid, crotonic acid and itaconic acid;

4) (meth)acrylic esters having an aromatic ring group such as phenyl (meth)acrylate, 2- or 4-chlorophenyl (meth)acrylate, 2-, 3-, or 4-ethoxycarbonylphenyl (meth)acrylate, o-, m- or p-tolyl (meth)acrylate, benzyl (meth)acrylate, phenetyl (meth)acrylate, and 2-naphthyl acrylate; and 5) (meth)acrylic esters having a cyclohexyl group such as cyclohexyl (meth)acrylate, 4-methylcyclohexyl (meth)acrylate, and 4-ethylcyclohexyl (meth)acrylate.

The polymer in the invention may be a homopolymer of the above monomer or a copolymer containing the above monomer. The polymer in the invention has preferably a hydroxyl group at least one of the polymer ends, which provides improved compatibility with the cellulose ester. The methods of incorporating a hydroxyl group into the polymer ends are not specifically limited, but include a method of employing a radical initiator having a hydroxyl group in the molecular end, a method of employing a radical chain transfer agent having a hydroxyl group, a method of employing a polymerization terminator having a hydroxyl group, and a method of incorporating a hydroxyl group according to an ionic polymerization. For example, a method disclosed in Japanese Patent O.P.I. Publication Nos. 2000-344823 and 2000-128911 can be used. Such a polymer is commercially available on the market, and examples thereof include Actflow produced by Soken Kagaku Co., Ltd., which is preferably used in the invention.

As (meth)acrylic esters, methyl acrylate or methyl methacrylate is preferable. In the invention, the polymer containing a methyl acrylate or methyl methacrylate monomer may be a homopolymer of methyl acrylate or methyl methacrylate or a copolymer of methyl acrylate or methyl methacrylate with another monomer, which may be suitably selected from the above described monomers. The polymer in the invention containing a methyl acrylate monomer in an amount of not less than 30 weight % is preferable in providing good water resistance. The polymer in the invention containing a methyl methacrylate monomer in an amount of not less than 40 weight % is also preferable. In the invention, a homopolymer of methyl acrylate is more preferable. In the invention, the polymer containing a methyl acrylate or methyl methacrylate monomer preferably has a hydroxyl group in at least one of the polymer ends.

As the (meth)acrylic esters having an aromatic ring group, benzyl (meth)acrylate or phenetyl (meth)acrylate is preferable. The polymer comprising the (meth)acrylic ester having an aromatic ring group may contain the (meth)acrylic ester in an amount of 20 to 40 weight %, and methyl (meth)acrylate in an amount of 30 to 80 weight %, and optionally another monomer. The polymer comprising the (meth)acrylic ester having an aromatic ring group has preferably a hydroxyl group in at least one of the polymer ends, which provides excellent water resistance and excellent compatibility with the cellulose ester.

As the (meth)acrylic esters having a cyclohexyl group, cyclohexyl (meth)acrylate is preferable. The polymer comprising the (meth)acrylic ester having a cyclohexyl group may contain the (meth)acrylic ester in an amount of 20 to 40 weight %, and methyl acrylate in an amount of 30 to 80 weight %, and optionally another monomer. The polymer comprising the (meth)acrylic ester having a cyclohexyl group has preferably a hydroxyl group in at least one of the polymer ends, which provides excellent water resistance and excellent compatibility with the cellulose ester.

The polymer in the invention has a glass transition point (hereinafter referred to also as Tg) of preferably not more than 50° C. The homopolymer having a Tg of not more than 50° C., which is prepared by polymerizing the above-described monomer, can give plasticity to the cellulose ester. The monomer whose homopolymer has a Tg exceeding 50° C. may be copolymerized with a comonomer to prepare a copolymer whose Tg is not more than 50° C. The comonomer capable of giving a Tg of not more than 50° C. can be used in an arbitrary amount to prepare a copolymer.

Polymerization in the invention is carried out according to an ordinary method employing emulsion polymerization, suspension polymerization or solution polymerization. The polymerization processes include a radical polymerization, a cationic polymerization, an anionic polymerization, and a living polymerization. Examples of initiators used in these polymerizations include benzoyl peroxide, t-butyl hydro peroxide, di-t-butyl peroxide, cumene hydroperoxide, azobisisobutyronitrile, boron trifluoride diethyl etherate, aluminum chloride, stannic chloride, titanium tetrachloride, n-butyllithium, potassium persulfate, ammonium persulfate, hydrogen peroxide, and include ferrous chloride, ferrous sulfate, sodium sulfite, and sodium thiosulfate used in the redox polymerization. When a polymer is synthesized which has a hydroxyl group in at least one of the ends, an azobisisobutyronitrile derivative having a hydroxy group, boron trifluoride diethyl etherate, or hydrogen peroxide is used as a polymerization initiator.

Next, examples of a polymer other than those described above contained in the cellulose ester film will be explained.

A cellulose ester dope for the cellulose ester film containing the polymer other than those described above can be divided into three kinds. The first cellulose ester dope is a dope containing an ethylenically unsaturated monomer and/or an ethylenically unsaturated monomer having a functional group, and a photopolymerization initiator. The second cellulose ester dope is a dope containing a compound having an epoxy group and/or a compound having an epoxy group and a functional-group, and a photopolymerization initiator. The above two dopes are cast on a moving endless metal support to form a web, and then subjected to UV irradiation during a period from the beginning of the casting till completion of drying to cause photopolymerization and produce a polymer in the web. The third cellulose ester dope is a dope containing a polymer obtained from polymerization of an ethylenically unsaturated monomer selected from vinyl esters and acrylic esters and/or an ethylenically unsaturated monomer selected from vinyl esters and acrylic esters each having a functional group.

A polymer contained in the cellulose ester dope or a polymer which is produced by photo-polymerizing a monomer contained in the cellulose ester dope may be any as long as the polymer is difficult to cause phase separation such as an island structure, does not aggregate, and provides mechanical or optical properties equal to or better than the cellulose ester film itself. The polymer contained in the cellulose ester dope has a glass transition point of preferably not more than 50° C. The polymer contained in the cellulose ester film is preferably a polymer which has good compatibility with the cellulose ester, and gives a water resistant and moisture vapor resistant property to the cellulose ester film. The number average molecular weight of the polymer used in the invention is 1,000 to 300,000, preferably 1,500 to 250,000, and more preferably 2,000 to 100,000. The polymer having a lower molecular weight is preferably a polymer having a molecular weight range in which the polymer is difficult to bleed out.

The first cellulose ester dope is a dope containing an ethylenically unsaturated monomer and/or an ethylenically unsaturated monomer having a functional group, and a photopolymerization initiator. The dope are cast on a support, and the ethylenically unsaturated monomer and/or an ethylenically unsaturated monomer having a functional group is photo-polymerized in the cast dope to produce a polymer, which provides water resistance to the obtained cellulose ester film. Examples of the ethylenically unsaturated monomer include vinyl esters such as vinyl acetate, vinyl propionate, vinyl butyrate, vinyl isobutyrate, vinyl valerianate, vinyl pivalate, vinyl caproate, vinyl enanthate, vinyl caprylate, vinyl caprate, vinyl laurate, vinyl myristate, vinyl palmitate, vinyl stearate, vinyl cyclohexanecarboxylate, vinyl sorbate and vinyl benzoate; acrylic esters or methacrylic esters (hereinafter referred to also as (meth)acrylic esters) such as methyl (meth)acrylate, ethyl acrylate, n-butyl (meth)acrylate, heptyl (meth)acrylate, 2-methylbutyl (meth)acrylate, 3-methylbutyl (meth)acrylate, hexyl (meth)acrylate, 3-methoxypropyl (meth)acrylate, 2-methoxyethyl (meth)acrylate, 2-ethoxyethyl (meth)acrylate, 2-ethylbutyl (meth)acrylate, 2-ethylhexyl (meth)acrylate, 3-ethoxypropyl (meth)acrylate, n-octyl (meth)acrylate, isooctyl (meth)acrylate, isononyl (meth)acrylate, isomyristyl (meth)acrylate, 2-hydroxyethyl (meth)acrylate, 2-hydroxybutyl (meth)acrylate, ε-caprolactone (meth)acrylate, benzyl (meth)acrylate, phenetyl (meth)acrylate, 4-cyanobutyl (meth)acrylate, and 2-cyanoethyl (meth)acrylate; vinyl ethers such as methyl vinyl ether, ethyl vinyl ether, propyl vinyl ether, butyl vinyl ether, 2-ethylhexyl vinyl ether, and hexyl vinyl ether; styrenes such as styrene, 4-[(2-butoxyethoxy)methyl]styrene, 4-butoxymethoxystyrene, 4-butylstyrene, 4-decylstyrene, 4-(2-ethoxymethyl)styrene, 4-(1-ethylhexyloxymethyl)styrene, 4-hydoxymethylstyrene, 4-hexylstyrene, 4-nonylstyrene, 4-octyloxymethylstyrene, 4-octylstyrene, 2-octylstyrene, and 4-propoxymethylstyrene; maleic acids such as dimethylmaleic acid, diethylmaleic acid, dipropylmaleic acid, dibutylmaleic acid, dimcyclohexylmaleic acid, di-2-ethylhexylmaleic acid, dinonylmaleic acid, and dibenzylmaleic acid, but the invention is not limited thereto.

Examples other than the above monomers include vinyl chloride, ethylene, propylene, butadiene, 1-butylene, (meth) acrylonitrile, N-vinylpyrrolidone, (meth)acrylic acid, maleic anhydride, chrotonic acid and itaconic acid. These monomers may be copolymerized in an amount of not more than 10 weight % with the above monomers to prepare a copolymer. The homopolymer having a Tg of not more than 50° C., which is prepared by polymerizing the above monomer, can provide plasticity to the cellulose ester. The monomer whose homopolymer has a Tg exceeding 50° C. may be copolymerized with a comonomer to prepare a copolymer whose Tg is not more than 50° C. The comonomer can be used in an arbitrary amount.

Tg of polymers can be measured according to various methods. Tg of homopolymers can be also obtained from the description on page VI-209 of J. Brandruop and E. H. Immergut et al., POLYMER HANDBOOK (THIRD EDITION) (published by JHON WILEY & SONS), and Tg of copolymers can be obtained according to a method described on pages III-139 to 179 of J. Brandruop et al., POLYMER HANDBOOK (1966) (published by JHON WILEY & SONS). Tg (represented in terms of °K) of copolymers can be also obtained from the following formula:

$$Tg \text{ (of copolymers)} = v_1 Tg_1 + v_2 Tg_2 + \ldots + v_n Tg_n$$

In formula, $v_1, v_2, \ldots v_n$ represent a weight content rate of monomers in the copolymer, and $Tg_1, Tg_2 \ldots Tg_n$ represent Tg of homopolymers of each monomer contained in the copolymer.

In the invention, the preferred monomers are vinyl esters such as vinyl acetate, vinyl propionate, vinyl butyrate, vinyl isobutyrate, vinyl valerianate, vinyl pivalate, vinyl caproate, vinyl enanthate, vinyl caprylate, vinyl caprate, vinyl laurate, vinyl myristate, vinyl palmitate, vinyl stearate, vinyl cyclohexanecarboxylate and vinyl sorbinate, methyl acrylate, ethyl acrylate, propyl acrylate, dimethylmaleic acid, diethylmaleic acid, propylmaleic acid or butylmaleic acid. The ethylenically unsaturated monomer comprised mainly of a monomer selected from vinyl esters and acrylic esters referred to in item 48 previously described implies that the ethylenically unsaturated monomer contains the monomer selected from vinyl esters and acrylic esters in an amount of not less than 40 weight %, preferably not less than 50 weight %, more preferably not less than 60 weight %, and most preferably not less than 70 weight %, based on the total weight of the ethylenically unsaturated monomer. The vinyl esters or acrylic esters herein referred to include vinyl esters or acrylic esters having the following UV absorbing group or antistatic group.

The ethylenically unsaturated monomer in the invention having a functional group is preferably a monomer having a UV absorbing group or an antistatic group. Any group can be used as long as it is a group which can provide a Tg of not more than 50° C. as a copolymer. The ethylenically unsaturated group of the ethylenically unsaturated monomer is preferably a vinyl group, an acryloyl group, or a methacryloyl group.

The UV absorbing group of the ethylenically unsaturated monomer having a UV absorbing group in the invention is preferably a benzotriazole group, a salicylic acid ester group, a benzophenone group, an oxybenzophenone group, or a cyanoacrylate group. The monomer is especially preferably a monomer having a benzotriazole group which is colorless and has excellent light fastness.

Examples of the ethylenically unsaturated monomer having a UV absorbing group in the invention will be shown below. Besides these, the UV absorbing monomer constituting the UV absorbing polymer as disclosed in Japanese Patent O.P.I. Publication No. 6-148430 can be preferably used.

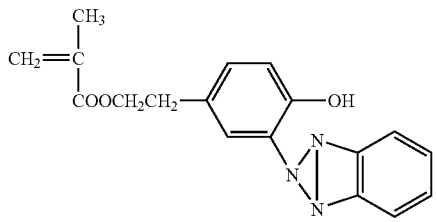

UVM-1

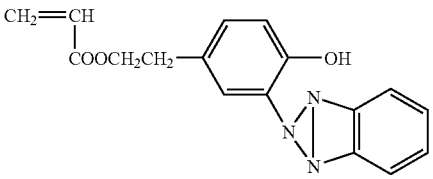

UVM-2

-continued
UVM-3
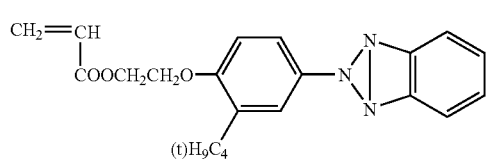
UVM-4
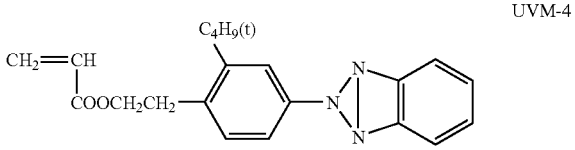
UVM-5
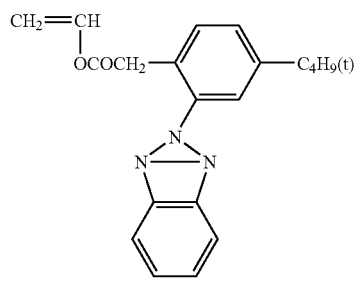
UVM-6
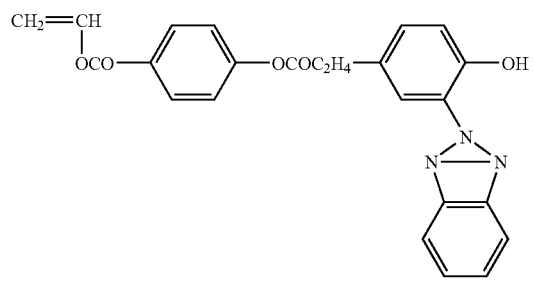
UVM-7
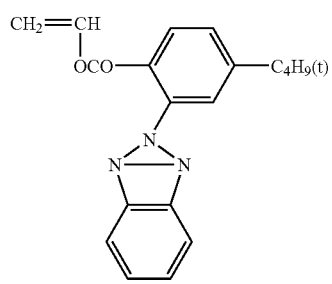
UVM-8
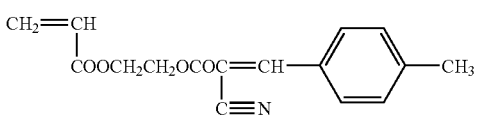
UVM-9
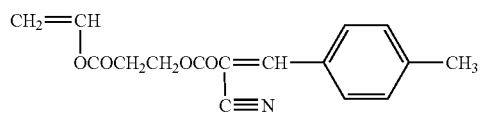
UVM-10
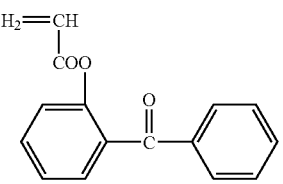
UVM-11
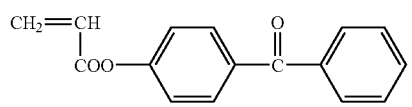
UVM-12
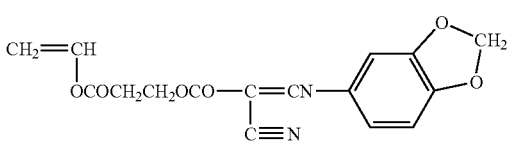
UVM-13
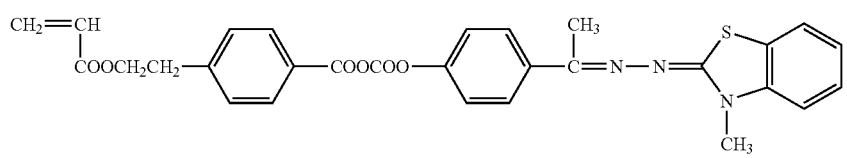

The ethylenically unsaturated monomer having a UV absorbing group in the invention may be those synthesized or those available on the market. For example, the above exemplified UVM-1, 1-hydroxy-2-(2-benzotriazolyl)-4-(2-methacroyloxyethyl)benzene is available on the market as a reactive UV absorbent RUVA-93 produced by Otsuka Seiyaku Co., Ltd. The monomer, 1-hydroxy-2-(2-benzotriazolyl)-4-(2-acroyloxyethyl)benzene is preferably used in the invention.

Synthesis examples of the ethylenically unsaturated monomer having a UV absorbing group used in the invention will be shown below.

SYNTHESIS EXAMPLES (Synthesis of UVM-1)

1-Hydroxy-2-(2-benzotriazolyl)-4-(2-hydroxyethyl)-benzene (Compound A) of 25.5 g (0.1 mol), and 17 ml (0.21 mol) of pyridine were added to 800 ml of toluene. A solution in which 13 ml (0.128 mol) of methacroyl chloride was dissolved in 10 ml of toluene was added dropwise in 30 minutes to the resulting solution, stirred at room temperature for one hour, and mixed with water. The resulting mixture was extracted with ethyl acetate. The extraction solution was dried over anhydrous sodium sulfate, filtered, and the solvent was distilled off under reduced pressure. The resulting residue was recrystallized from a mixture solvent of methanol and methylene chloride to obtain 22.3 g of UVM-1. The chemical structure of UVM-1 was confirmed according to $^1$H-NMR and IR.

(Synthesis of UVM-6)

1-Hydroxy-2-(2-benzotriazolyl)-4-(2-hydroxycarbonylethyl)-benzene (Compound B) of 28.3 g (0.1 mol), and 0.2 ml of dimethylformamide were added to 800 ml of toluene. Oxalyl chloride of 13.0 ml (0.15 mol) were added dropwise at room temperature to the resulting solution, then stirred for one hour, and the solvent was distilled off under reduced pressure to obtain a white residue. The resulting residue was dissolved in a mixture of 8.9 ml (0.11 mol) of pyridine and 200 ml of tetrahydrofuran. A solution in which 18.0 g (0.11 mol) of vinyl 4-hydroxybenzoate was dissolved in 50 ml of tetrahydrofuran was added dropwise in 30 minutes to the resulting solution, stirred at room temperature for one hour, and mixed with water. The resulting mixture was extracted with ethyl acetate. The extraction solution was dried over anhydrous sodium sulfate, filtered, and concentrated under reduced pressure. The concentrate was purified according to silica gel chromatography to obtain 21.8 g of UVM-6. The chemical structure of UVM-6 was confirmed according to $^1$H-NMR and IR.

The content of a monomer having a UV absorbing group in the polymer in the invention obtained by photopolymerization may be any (for example, 1 to 100 weight %), as long as it provides sufficient compatibility with the cellulose ester, mechanical and physical properties equal to or more excellent than the cellulose ester and sufficient UV absorption.

Examples of the antistatic group of the ethylenically unsaturated monomer having an antistatic group useful for the invention include a quaternary ammonium group, a sulfonate group, or a polyethyleneoxy group. The quaternary ammonium group is preferable in view of solubility or an antistatic property.

Examples of the ethylenically unsaturated monomer having an antistatic group useful for the invention will be shown below.

ASM-1

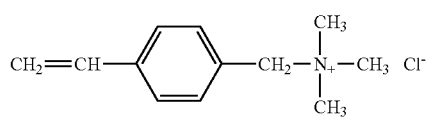

ASM-2

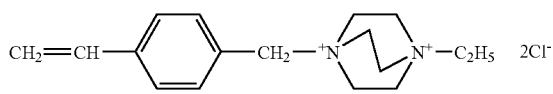

ASM-3

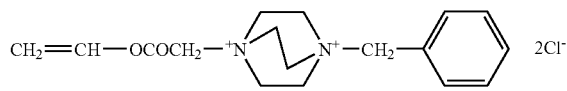

ASM-4

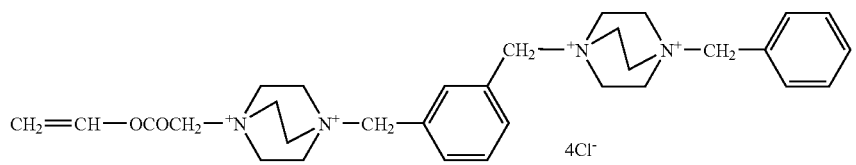

ASM-5

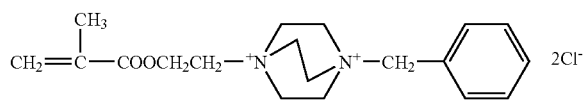

ASM-6

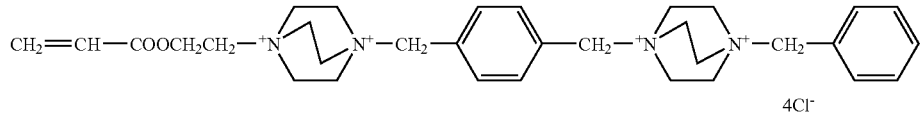

ASM-7

$CH_2=CH-COOCH_2CH_2-\overset{\overset{\displaystyle CH_3}{|}}{\underset{\underset{\displaystyle CH_3}{|}}{N^+}}-CH_3 \quad Cl^-$

ASM-8

$CH_2=CH-OCOCH_2-\overset{\overset{\displaystyle CH_3}{|}}{\underset{\underset{\displaystyle CH_3}{|}}{N^+}}-CH_3 \quad Cl^-$

ASM-9

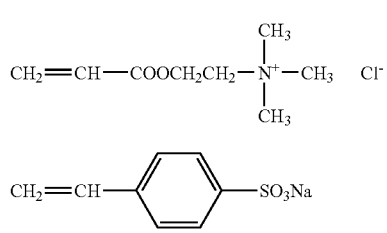

Synthesis examples of the ethylenically unsaturated monomer having an antistatic group useful for the invention will be shown below.

SYNTHESIS EXAMPLES (Synthesis of ASM-1)

Toluene of 50 ml, 14.2 ml (0.1 mol) of 4-vinylbenzylchloride, 9.0 ml (0.1 mol) of trimethylamine, and 1.7 g (0.01 mol) of t-butylcatechol were placed in a sealed vessel, and heated at 70° C. for 48 hours. The reaction mixture was filtered off to obtain a solid, and the solid was washed with acetone to obtain 12.1 g of ASM-1. The chemical structure of ASM-1 was confirmed according to $^1$H-NMR and IR.

(Synthesis of ASM-2)

Toluene of 50 ml, 11.2 g (0.1 mol) of triethylenediamine (DABCO), and 7.2 ml (0.1 mol) of ethyl chloride were placed in a sealed vessel, and heated at 70° C. for 72 hours. The reaction mixture was filtered off to obtain a solid, and the solid was washed with ethyl ether to obtain N-ethyltriethylenediamine monoammonium chloride (Compound C). 4-Vinylbenzyl chloride of 7.1 ml (0.05 mol), 10.6 g (0.05 mol) of Compound C and 0.9 g (0.005 mol) of t-butylcatechol were added to 50 ml of ethanol and heated under reflux for 48 hours. The reaction mixture was filtered off to obtain a solid, and the solid was washed with acetone to obtain 7.3 g of ASM-2. The chemical structure of ASM-2 was confirmed according to $^1$H-NMR and IR.

(Synthesis of ASM-4)

2-Chloroethanol of 6.7 ml (0.1 mol) and 8.9 ml (0.2 mol) of pyridine were added to 200 ml of tetrahydrofuran. A solution in which 10.7 ml (0.11 mol) of methacryl chloride was dissolved in 50 ml of tetrahydrofuran was added dropwise in 30 minutes to the resulting solution, stirred at room temperature for one hour, and mixed with water. The resulting mixture was extracted with ethyl acetate. The extraction solution was dried over anhydrous sodium sulfate, filtered, and concentrated under reduced pressure to obtain 2-chloroethyl methacrylate. DABCO of 11.2 g (0.1 mol) and 11.5 g (0.1 mol) of benzyl chloride were added to 100 ml of ethanol and heated under reflux for 48 hours. The reaction mixture was filtered off to obtain a solid, and the solid was washed with acetone to obtain N-ethyl-DABCO monoammonium chloride (Compound D). Compound D of 11.9 g (0.05 mol), 7.4 g (0.05 mol) of 2-chloroethyl methacrylate, and 0.9 g (0.005 mol) of t-butylcatechol were added to 50 ml of ethanol and heated under reflux for 48 hours. The reaction mixture was filtered off to obtain a solid, and the solid was washed with acetone to obtain 10.5 g of ASM-4. The chemical structure of ASM-4 was confirmed according to $^1$H-NMR and IR.

The content of a monomer having an antistatic group in the polymer in the invention obtained by photopolymerization may be not more than 40 weight %, and is preferably 5 to 30 weight %, in view of a water absorption property, durability, plasticity and an antistatic property of the cellulose ester film containing the polymer.

The photopolymerization initiator in the invention may be any initiator as long as it can initiate photo-polymerization of the ethylenically unsaturated monomer in the web, and the conventional initiators can be used. Photosensitizers can be also used. Examples of the photopolymerization initiator include benzoin methyl ether, benzoin n-propyl ether, benzoin n-butyl ether, benzoin silyl ether, methylbenzoin formate, benzil, benzophenone, hydroxy-benzophenone, p-methylbenzophenone, α-hydroxyisobuthyl-phenone, p-isopropyl-α-hydroxyisobuthylphenone, acetophenone, Michler's ketone, α,α'-dichloro-4-phenoxyacetophenone, 1-hydroxy-1-cyclohexylacetophenone, 2,2-dimethoxy-2-phenylacetophenone, diacetyl, eosin, thionin, 2-methyl-1-[4-(methylthio)phenyl]-2-morpholinopropene, dichlorothioxanthone, diisopropylthioxanthone, phenyl-disulfide-2-nitrofluorenone, butyroin, anisoin ethyl ether, di-t-butyl peroxide, benzoylthiazolylsulfide, α-amyloximlester, azobisisobutyronitrile, and tetramethyl-thiuramdisulfide. It is preferred that the cellulose ester dope contains 5 to 30 weight % of the ethylenically unsaturated monomer based on the cellulose ester and contains 1 to 30 weight % of the photopolymerization initiator based on the ethylenically unsaturated monomer. When the cellulose ester dope containing a photopolymerizable ethylenically unsaturated monomer is cast on a metal support to form a web, photopolymerization can be carried but both in the wet web in which a considerable amount of the solvent remains and in the dry web in which only a slight amount of the solvent remains. It is preferred in the invention that UV irradiation photopolymerization is carried out on the metal support.

The cellulose ester dope containing an ethylenically unsaturated monomer and a photopolymerization initiator can further contain a cross-linking monomer having two ethylenically unsaturated groups. The cellulose ester prepared by photopolymerizing such a cellulose ester dope provides a cellulose ester film having flexibility and toughness. The cross-linking monomers having two ethylenically unsaturated groups include polyester di(meth)acrylate, and polyurethane di(meth)acrylate. There is, for example, a commercially available urethane acrylate M-1310 (produced by Toa Gosei Co., Ltd.). Examples of the cross-linking monomers will be shown below.

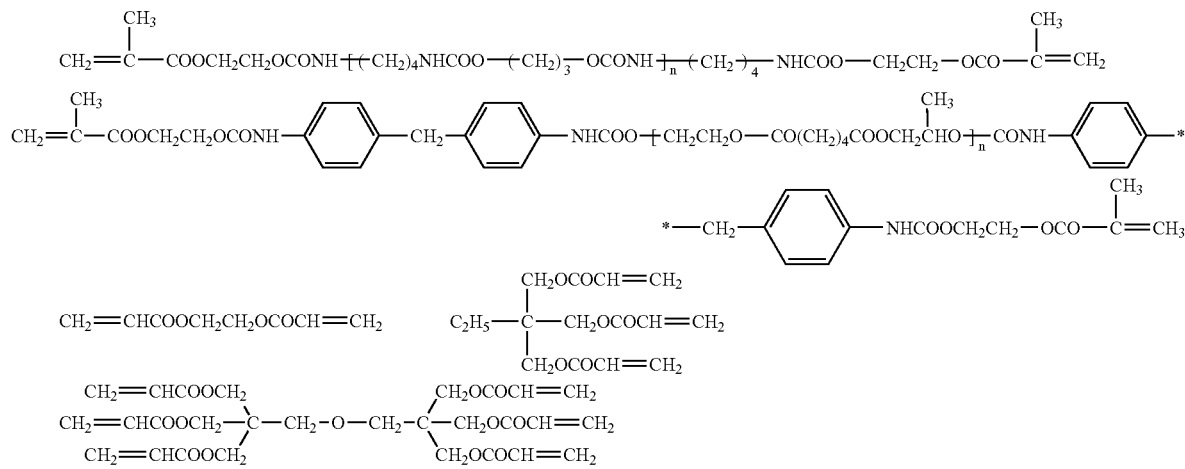

The number average molecular weight of these polyester di(meth)acrylates and polyurethane di(meth)acrylates is preferably 1000 to 80,000, and more preferably 6,000 to 100,000. In the above chemical structures, "n" is the number of the repeating unit.

The second cellulose ester dope is a dope containing a compound having an epoxy group and a photopolymerization initiator. In the same manner as in the first cellulose ester dope, photopolymerization of the second cellulose ester dope can be carried out in the web to obtain a cellulose ester containing a polymer which can provide a film with plasticity. As the compound having an epoxy group, those used in the conventional adhesives can be also used. The compounds having an epoxy group include (a) aromatic epoxy compounds (polyglycidyl ethers of polyhydric phenols), (b) aliphatic epoxy compounds (polyglycidyl ethers of polyhydric alcohols or its adducts with alkylene oxides, or polyglycidyl esters of aliphatic polybasic acids), (c) alicyclic epoxy compounds, (d) heterocyclic epoxy compounds and (e) a glycidyl acrylate or glycidyl methacrylate homopolymer or a glycidyl acrylate or glycidyl methacrylate copolymer. Examples of (a) aromatic epoxy compounds include glycidyl ether, a reaction product of bisphenol A or hydrogenated bisphenol A with epichlorohydrin, epoxy novolak resins (for example, polyglycidyl ether of cresol novolak resins, or polyglycidyl ether of phenol novolak resins), epoxy resol resins, and diglycidyl ether of resorcinol. Examples of (b) aliphatic epoxy compounds include ethylene glycol diglycidyl ether, propylene glycol diglycidyl ether, diethylene glycol diglycidyl ether, dipropylene glycol diglycidyl ether, tripropylene glycol diglycidyl ether, 1,4-butanediol diglycidyl ether, 1,6-hexanediol diglycidyl ether, nonapropylene glycol diglycidyl ether, neopentyl glycol diglycidyl ether, glycerin triglycidyl ether, diglycerol triglycidyl ether, diglycerol tetraglycidyl ether, trimethylolpropane triglycidyl ether, pentaerythritol triglycidyl ether, pentaerythritol tetraglycidyl ether, and polyglycidyl ether of sorbitol. Examples of (c) alicyclic epoxy compounds include 3,4-epoxycyclohexylmethyl-3',4'-epoxycyclohexanecarboxylate, 2-(3,4-epoxycyclohexyl-5,5-spiro-3'4'-epoxy) cyclohexane-meta-dioxane, bis(3,4-epoxycyclohexylmethyl)adipate, vinylcyclohexene dioxide, bis(3,4-epoxy-6-methylcyclohexylmethyl)adipate, 3,4-epoxy-6-methylcyclohexylmethyl-3',4'-epoxy-6-methylcyclohexane-carboxylate, methylenebis(3,4-epoxycyclohexane)-dicyclopentadiene diepoxide, ethylene glycol di-3,4-epoxycyclohexylmethyl ether, ethylenebis (3,4-epoxycyclohexanecarboxylate), and dicyclopentadiene diepoxide. Examples of (d) heterocyclic epoxy compounds include tris (2-hydroxyethyl) isocyanurate diglycidyl ether, and tris(2-hydroxyethyl) isocyanurate triglycidyl ether. Examples of (e) the glycidyl acrylate or glycidyl methacrylate homopolymer or the glycidyl acrylate or glycidyl methacrylate copolymer include polyglycidyl acrylate, polyglycidyl methacrylate, a copolymer of glycidyl acrylate or glycidyl methacrylate with another monomer, poly(2-glycidyloxyethylacrylate), poly(2-glycidyloxyethylmethacrylate), a copolymer of 2-glycidyloxyethylacrylate or 2-glycidyloxyethylmethacrylate with another monomer. There is as another epoxy compound, for example, bis-2,2-hydroxycyclohexylpropane diglycidyl ether. The invention is not limited to these epoxy compounds. These epoxy compounds can be used in combination.

In the invention, monoepoxides can be optionally used in addition to a compound having two epoxy groups in the molecule.

The UV photopolymerizable compound having an epoxy group in the invention is not polymerized by radical polymerization but is polymerized by cationic polymerization to form a polymer, or a polymer having cross-linked or network structures. Unlike the radical polymerization, cationic polymerization proceeds rapidly without the induced period since it is not influenced by oxygen.

The cationic polymerization of the compound having an epoxy group is carried out employing as an initiator a compound capable of releasing a substance initiating cationic polymerization by UV irradiation. As the initiator initiating cationic polymerization by UV irradiation, onium salts capable of releasing Lewis acid are especially preferable.

Typical examples of the onium salts are compound represented by the following formula (I):

$$[(R^1)_a(R^2)_b(R^3)_c(R^4)_d Z]^{+w}[MeX_{v+w}]^{-w} \qquad \text{formula (I)}$$

wherein the cation represents an onium cation, Z represents S, Se, Te, P, As, Sb, Bi, O, halogen (for example, I, Br or Cl), or N=N (diazo); $R^1$, $R^2$, $R^3$, and $R^4$ independently represent an organic group and may be the same as or different from another; a, b, c, and d independently represent an integer of 0 to 3, provided that a+b+c+d equals to valence of Z; Me is a center atom of the halide complex ion, and represents a metal or mataloid selected from B, P, As, Sb, Fe, Sn, Bi, Al, Ca, In, Ti, Zn, Sc, V, Cr, Mn, and Co; X represents a halogen atom; w represents an ionic valence of the halide complex ion; and v represents the number of halogen atoms in the halide complex ion.

Examples of $[MeX_{v+w}]^{-w}$ in formula (1) include tetrafluoroborate ($BF_4^-$), hexafluorophosphate ($PF_6^-$), hexafluoroantimonate ($SbF_6^-$), hexafluoroarsenate ($AsF_6^-$), and hexachloroantimonate ($SbCl_6^-$).

An anion represented by formula $MX_n(OH)^-$ can be used. As other anions, anions such as a perchlorate ion ($ClO_4^-$), a trifluoromethylsulfite ion ($CF_3SO_3^-$), a fluorosulfonate ion ($FSO_3^-$), a toluenesulfonate ion or a trinitrobenzoic acid anion can be also used.

Use of aromatic onium salts for cationic polymerization is effective. Of these, aromatic halonium salts as disclosed in Japanese Patent O.P.I. Publication Nos. 50-151996 and 50-158680, aromatic onium salts of elements belonging to group VIA of the periodic table as disclosed in Japanese Patent O.P.I. Publication Nos. 50-151997, 52-30899, 59-55420, and 55-125105, oxosulfoxonium salts as disclosed in Japanese Patent O.P.I. Publication Nos. 56-8428, 56-149402, and 57-192429, aromatic diazonium salts as disclosed in Japanese Publication No. 49-17040, or thiapyrylium salts as disclosed in U.S. Pat. No. 4,139,655 are preferable. Further, photopolymerization initiators such as aluminum complexes and photodegradable silicon compounds can be also used. The above-described cationic polymerization initiators and the above described photosensitizers such as benzophenone or its derivatives, benzoin or its derivatives, thioxanthones or its derivatives can be used in combination. The sensitizers are preferably sensitizers having absorption maximum in the wavelength range of from near ultraviolet to visible range.

The second cellulose ester dope is a dope containing a compound having an epoxy group, a photopolymerization initiator and optionally a sensitizer. It is preferred that the cellulose ester dope contains the compound having an epoxy group in an amount of 5 to 30 weight % based on the cellulose ester and contains the photopolymerization initiator in an amount of 1 to 30 weight %, preferably 1 to 10 weight % based on the compound having an epoxy group.

The compound useful for the invention having an epoxy group and a UV absorbing group may be mixed with a photopolymerization initiator, and the compound useful for the invention having an epoxy group may be mixed with a photopolymerization initiator.

The UV absorbing group in the compound having an epoxy group and a UV absorbing group is preferably a benzotriazole group, a salicylic acid ester group, a benzophenone group, an oxybenzophenone group, or a cyanoacrylate group. The compound is especially preferably a compound having a benzotriazole group which is colorless and has excellent light fastness.

Examples of the compound having an epoxy group and a UV absorbing group will be shown below.

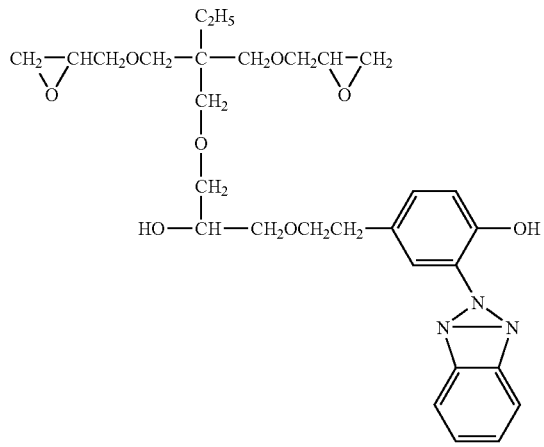

UVE-1

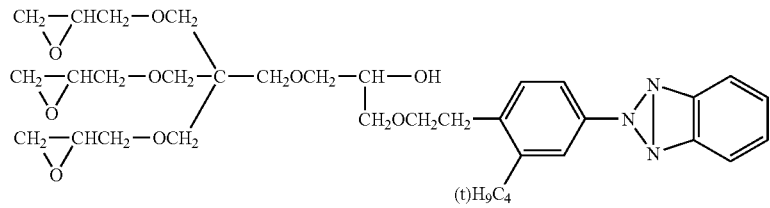

UVE-2

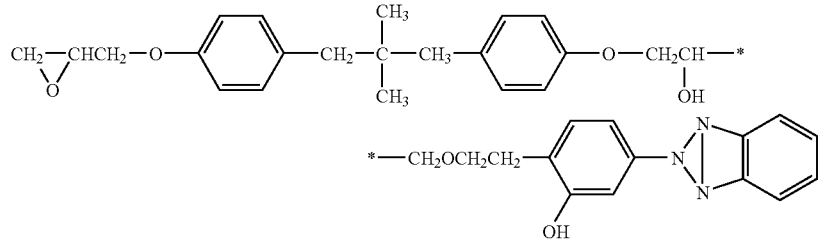

UVE-3

-continued

UVE-4

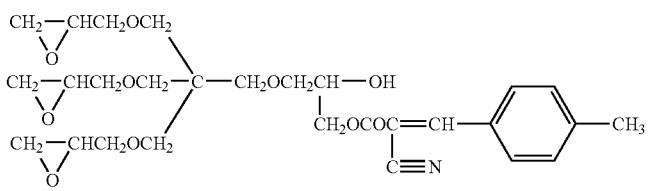

The cellulose ester dope containing a compound having an epoxy group and a UV absorbing group is cast according to a solution casting film forming method to form a web, and the web is subjected to UV irradiation. The web subjected to UV irradiation causes neither precipitation nor volatilization of the UV absorbents, resulting in good productivity, and provides a protective film with high quality for a polarizing plate used in a liquid crystal display. It is preferred that the polymer of the compound having an epoxy group and a UV absorbing group has an excellent water resistance to the cellulose ester and Tg of the polymer is not more than 50° C.

The content of the compound having an epoxy group in the polymer obtained by photopolymerization may be any (for example, 1 to 100 weight %), as long as it provides sufficient compatibility with the cellulose ester, mechanical and physical properties equal to or more excellent than the cellulose ester, and sufficient UV absorption.

Synthesis examples of the compound having an epoxy group and a UV absorbing group used in the invention will be shown below.

SYNTHESIS EXAMPLES (Synthesis of UVE-1)

Trimethylolpropane triglycidyl ether (Compound C) of 30.2 g (0.1 mol), 12.8 g (0.05 mol) of Compound A and 0.24 g (2.5 mol) of tetramethylammonium chloride were dissolved in 50 ml of toluene. The resulting solution was heated under reflux for 2 hours, and mixed with water. The resulting mixture was extracted with ethyl acetate. The extraction solution was dried over anhydrous sodium sulfate, filtered, and concentrated under reduced pressure. The resulting concentrate was purified according to silica gel chromatography to obtain UVE-1. The chemical structure of UVE-1 was confirmed according to $^1$H-NMR and IR.

In the invention, the cellulose ester dope is a dope containing a compound having an epoxy group, a photopolymerization initiator and optionally a sensitizer. It is preferred that the cellulose ester dope contains the compound having an epoxy group in an amount of 5 to 30 weight % based on the cellulose ester and contains the photopolymerization initiator in an amount of 1 to 30 weight %, preferably 1 to 10 weight % based on the compound having an epoxy group.

A method of preparing a cellulose ester film employing a solution casting apparatus, and particularly UV irradiation during the film preparation will be explained.

The above-described cellulose ester dope containing an ethylenically unsaturated monomer or a compound having an epoxy group is cast from a die onto the surface of a metal support configured in a loop form to form a dope film (hereinafter referred to as a web). The web is heated to evaporate the solvent, and peeled from the metal support surface when the residual solvent in the web is 30 to 150% by weight before one round of the web is made. The metal support is a stainless steel belt or a drum having a polished mirror surface. Heating of the web is carried out by blowing heated air directly on the web surface, or through thermal conduction in which the rear surface of the support is heated by heated air or liquid. There is also a method in which the dope is cast on a metal support cooled to not more than 20° C. to form a solidified web, and the web is peeled from the support without drying.

The residual solvent amount can be represented employing the formula described below.

Residual solvent amount (weight %)=$\{(M-N)/N\}\times 100$, wherein M represents the weight of a web at an optional time, and N represents the weight of M after M has been dried at 110° C. for 3 hours.

The peeled web is dried in a drier in which the web is conveyed through rollers positioned in a zigzag fashion and/or in a drier in which the web is conveyed while clipping both ends of the web. Thus, a cellulose ester film is obtained. The web in the drier is dried ordinarily at 80 to 150° C., but the drying temperature is preferably elevated as the residual solvent amount decreases, in view of shrinkage of the web. Heating of the web is carried out employing heated air, infrared rays, heated rollers, microwaves, or the like, which is optionally used. The peeled web is dried not only in a roller drier, but also in a tenter drier in which both ends of the web may be held so as not to shrink or the web may be slightly stretched. The tenter drier may be either a drier of a pin tenter type or a drier of a clip tenter type. In order to obtain the cellulose ester film for a liquid crystal display, the tenter drier, in which the web is stretched by 0.5 to 1.05% in the width direction, is preferably used. The web is irradiated with UV light at any time during from the beginning of the casting till the completion of the drying. The web is preferably irradiated with UV light particularly when the web is conveyed on the metal support surface, wherein the web contains the organic solvent in a proper amount in the web, the molecules in the web can easily move and photo-polymerization proceeds smoothly.

The UV light sources capable of photopolymerizing the ethylenically unsaturated monomer or the compound having an epoxy group include a low pressure mercury lamp, a medium pressure mercury lamp, a high pressure mercury lamp, a super high pressure mercury lamp, a xenon lamp, a carbon arc, a metal halide lamp, and sun light. Photopolymerization can be carried out in air or in inert gas. Photopolymerization of the ethylenically unsaturated monomer may be carried out in air. However, in order to shorten the induction period of photopolymerization, the photopolymerization is preferably carried out in a gas having as low an oxygen concentration as possible. Irradiation intensity of UV light is preferably 0.1 to 100 mW/cm$^2$, and irradiation amount of UV light is preferably 100 to 20,000 mJ/cm$^2$.

The cellulose ester dope containing in advance a polymer obtained by polymerizing an ethylenically unsaturated monomer will be explained below.

The monomers constituting the above-described polymer include the same ethylenically unsaturated monomers as denoted previously. Of these monomers, vinyl esters are preferable. As the ethylenically unsaturated monomer, acrylic esters, vinyl esters or maleic diesters are preferable, and vinyl esters are especially preferable. The polymer is preferably a polymer which is compatible with the cellulose esters, and is uniformly mixed with the cellulose esters without phase separation. Polymerization of the monomers is ordinarily carried out by radical polymerization or cationic polymerization, in which solution polymerization, bulk polymerization, suspension polymerization or emulsion polymerization is employed. The polymer, which has been obtained by being precipitated from the polymerization mixture and purified, may be dissolved in a solvent, and the resulting solution is added to a cellulose ester dope. Particularly when solution polymerization is employed, the resulting polymerization mixture can be added directly to a cellulose ester dope. The polymer is required to be soluble in an organic solvent used in the cellulose ester dope. Examples of such an organic solvent include methylene chloride, ethylene chloride, chloroform, methyl acetate, methyl formate, ethyl formate, and fluorinated alcohol. The solvent is preferably methylene chloride or methyl acetate.

Examples of the radical polymerization initiators used in the invention include benzoyl peroxide, acetyl peroxide, t-butyl hydroxyperoxide, t-butyl peroxide, cumene hydroperoxide, di-tert-butyl peroxide, dicumene peroxide, azobisisobutyronitrile, azobiscyclohexanecarbonitrile, hydrogen peroxide, potassium persulfate, ammonium persulfate, potassium persulfate-sodium bisulfite, benzoyl peroxide-ammonium ferrous sulfate, ammonium persulfate-sodium metasulfite, and ammonium persulfate-sodium thiosulfate. Examples of the cation polymerization initiators used in the invention include Lewis acids such as $BF_3$, $AlCl_3$, $TiCl_4$, $SnCl_2$, and $SnCl_4$ and co-catalysts having an unpaired electron such as water, alcohols, carboxylic acids, ethers, and halogenated hydrocarbons; protonic acids such as sulfuric acid, phosphoric acid, trichloroacetic acid, and trifluoroacetic acid; and compounds capable of easily generating a cation such as $I_2$, $BF_3O(C_2H_5)_2$, $AgCl_4$, and $(C_6H_5)_3CCl$.

The organic solvents used in the solution polymerization may be any as long as they are those which are difficult to cause chain transfer. Examples of the organic solvents include methanol, ethanol, acetone, methyl ethyl ketone, tetrahydrofuran, dioxane, 1,3-dioxolane, methyl acetate, ethyl acetate, and methylene chloride. In the emulsion polymerization, an anionic surfactant, a nonionic surfactant, and a cationic surfactant can be used, and a water-soluble polymer such as polyvinyl alcohol can be also used.

A polymerization vessel is a pressure resistant one, and preferably has a stirrer, a dropping funnel and a nitrogen introducing tube. Polymerization is ordinarily carried out under nitrogen atmosphere, and polymerization temperature varies depending on the polymerization processes. Radical polymerization is carried out ordinarily at −10 to 100° C. Cation polymerization is carried out ordinarily at low temperature of −150 to −50° C., since polymerization violently occurs.

Examples of the polymers useful for the invention will be shown below, but the invention is not limited thereto.

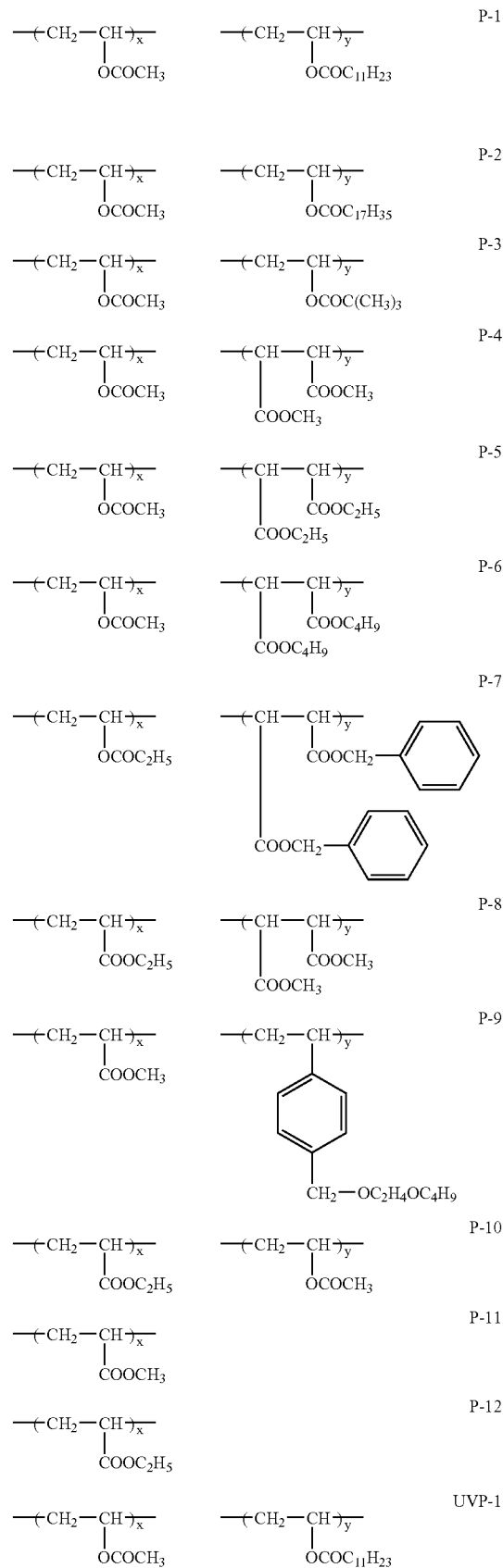

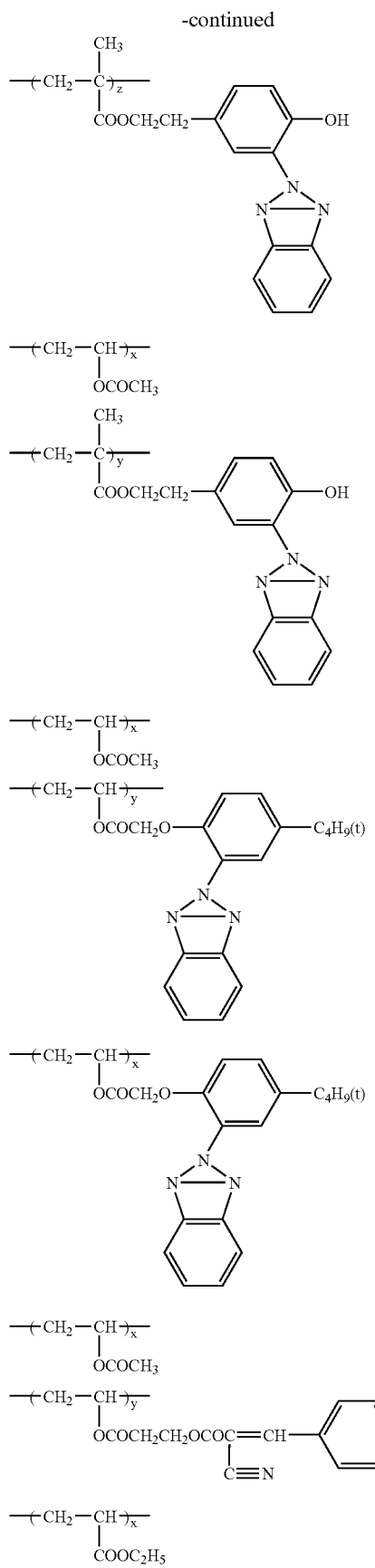

UVP-2

UVP-3

UVP-4

UVP-5

UVP-6

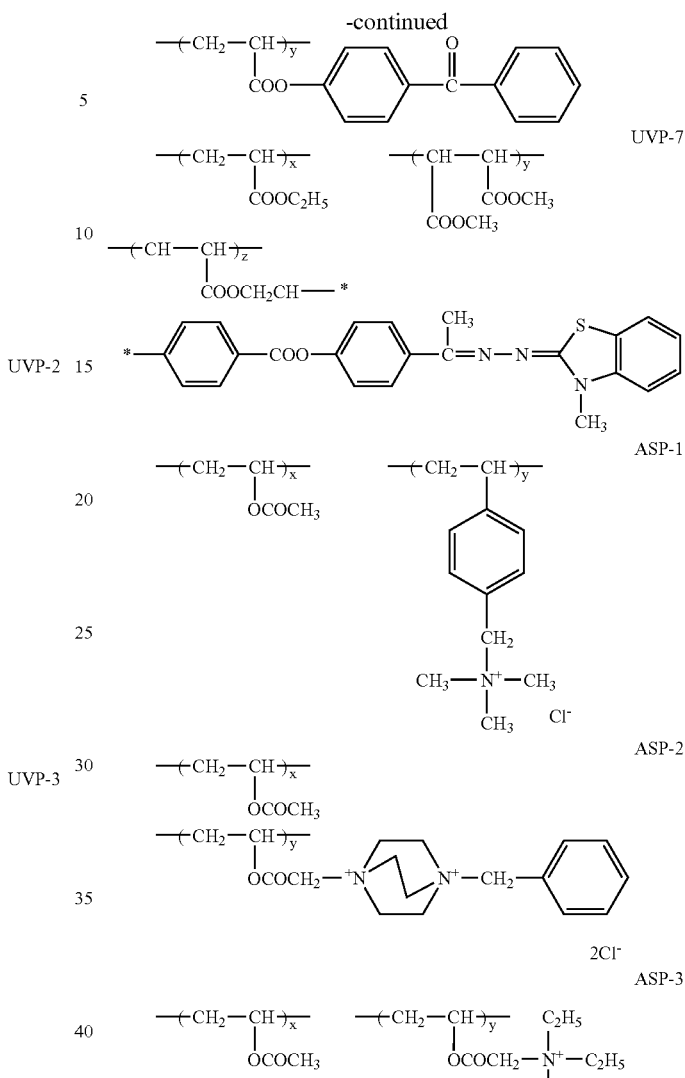

UVP-7

ASP-1

ASP-2

ASP-3

In the above, x, y and z independently represent weight %, provided that x+y+z=100 (%), and y in P-4 through P-8 and UVP-7 is 1 to 50.

Besides the above polymers UVP-1 through UVP-7, the polymers having a UV absorbing group as disclosed in Japanese Patent O.P.I. Publication No. 6-148430 are preferably used in the invention. Polymerization examples of these polymers will be shown below.

POLYMERIZATION EXAMPLES (Polymerization of P-1)

A 100 ml three-necked flask was charged with 36 g of a vinyl acetate monomer and 4 g of a vinyl laurate monomer. The flask was evacuated using a vacuum pump, and replaced with nitrogen three times. To the flask were added 60 ml of anhydrous tetrahydrofuran and the resulting solution was heated under reflux. A tetrahydrofuran solution containing 30 mg of α,α'-azobisisobutyronitrile (AIBN) was added to the solution, and further heated under reflux for additional 3 hours. After evaporating the reaction solvent under reduced pressure, the residue was dissolved in the smallest possible amount of tetrahydrofuran to obtain a solution. The resulting solution was re-precipitated in water, and the resulting precipitates were filtered off. Thus, polymer P-1 was obtained. The monomer content ratio, vinyl acetate to vinyl laurate ratio in the P-1 was 90/10 by weight. The molecular weight of the polymer P-1 was measured according to GPC, and the weight average molecular weight of the polymer P-1 was 16,800.

(Polymerization of UVP-1)

A 100 ml three-necked flask was charged with 16 g of a vinyl acetate monomer, 8 g of a vinyl laurate monomer, and 16 g of UVM-1. The flask was evacuated using a vacuum pump, and replaced with nitrogen three times. To the flask were added 60 ml of anhydrous tetrahydrofuran and the resulting solution was heated under reflux. A tetrahydrofuran solution containing 30 mg of AIBN was added to the solution, and further heated under reflux for additional 3 hours. After evaporating the reaction solvent under reduced pressure, the residue was dissolved in the smallest possible amount of tetrahydrofuran to obtain a solution. The resulting solution was re-precipitated in water, and the resulting precipitates were filtered off. Thus, polymer UVP-1 was obtained. The monomer content ratio, x/y/z ratio in the UVP-1 was 40/20/40 by weight. The molecular weight of the polymer UVP-1 was measured according to GPC, and the weight average molecular weight of the polymer UVP-1 was 24,400.

(Polymerization of ASP-1)

A 100 ml three-necked flask was charged with 24 g of a vinyl acetate monomer and 16 g of an ASM-1 monomer. The flask was evacuated using a vacuum pump, and replaced with nitrogen three times. To the flask were added 60 ml of anhydrous tetrahydrofuran and the resulting solution was heated under reflux. A tetrahydrofuran solution containing 30 mg of AIBN was added to the solution, and further heated under reflux for additional 3 hours. After evaporating the reaction solvent under reduced pressure, the residue was dissolved in the smallest possible amount of tetrahydrofuran to obtain a solution. The resulting solution was re-precipitated in water, and the resulting precipitates were filtered off. Thus, polymer ASP-1 was obtained. The monomer content ratio, x/y ratio in the ASP-1 was 60/40 by weight. The molecular weight of the polymer ASP-1 was measured according to GPC, and the weight average molecular weight of the polymer UVP-1 was 32,000.

The cellulose ester film does not substantially contain a low molecular weight plasticizer or UV absorbent, and no substances are crystallized or volatilized from the web during its manufacture, resulting in no contamination of the film. The cellulose ester film used in a liquid crystal display is an excellent film, which does not produce substances to be crystallized or volatilized even at such high humidity and high temperature as may occur in an enclosed vehicle.

The retention property, which represents the rate of mass change of the film due to crystallization or volatilization at high humidity and high temperature, is most preferably zero. However, a small reduction of the film weight is unavoidable, since the film contains residual volatile solvents. The retention property in the invention is preferably not more than 1.0%, more preferably not more than 0.5%, and still more preferably not more than 0.1%.

Dimensional stability at high humidity and high temperature is improved in the invention, and the rate of dimensional change of the cellulose ester film is reduced as compared with that of a cellulose ester film which does not contain the polymer. After the cellulose ester film is stored at 80° C. and 90% RH for 50 hours, the rate of dimensional change of the film is preferably within the range of ±1.0%, more preferably within the range of ±0.5%, still more preferably within the range of ±0.4%, and still further more preferably within the range of ±0.3%.

Some film performances at such high humidity and high temperature as described above often relate to the water absorption property of the film. The rate (defined later) of water absorption of the cellulose ester film containing the polymer in the invention is low as compared with that of a cellulose ester film which does not contain the polymer in the invention. A conventional cellulose ester film has a rate of water absorption of approximately 3 weight %, but the cellulose ester film of the invention has a rate of water absorption of not more than 2 weight %.

A cellulose ester-film containing a polymer having a UV absorption group does not reduce the amount of the UV absorbing compound and can efficiently absorb UV rays. The UV absorption property of the cellulose ester film does not deteriorate at high humidity and high temperature.

The cellulose ester film containing a polymer having an antistatic group is resistant to foreign materials such as dust during its manufacture, resulting in high manufacture yield.

The cellulose ester film containing a polymer provides excellent retardation without increase of the thickness.

Film curl occurs in a conventional cellulose ester film due to movement of the plasticizers in the thickness direction during its manufacture. However, the cellulose ester film containing the polymer in the invention results in no film curl, and provides good flatness, since such movement does not occur in the cellulose ester film.

Besides the above properties, the cellulose ester film containing the polymer in the invention has physical, mechanical or chemical properties equal to or better than conventional cellulose ester film.

Next, an organic solvent used in the cellulose ester dope of the invention will be explained.

Examples of good solvents of the cellulose ester include methyl acetate, ethyl acetate, amyl acetate, ethyl formate, acetone, cyclohexanone, methyl acetoacetate, tetrahydrofuran, 1,3-dioxolan, 4-methyl-1,3-dioxolan, 1,4-dioxane, 2,2,2-trifluoroethanol, 2,2,3,3-tetrafluoro-1-propanol, 1,3-difluoro-2-propanol, 1,1,1,3,3,3-hexafluoro-2-methyl-2-propanol, 1,1,1,3,3,3-hexafluoro-2-propanol, 2,2,3,3,3-pentafluoro-1-propanol, nitroethane, 2-pyrrolidone, N-methyl-2-pyrrolidone, 1,3-dimethyl-2-imidazolidinone, methylene chloride or bromopropane. Of these, methyl acetate, acetone or methylene chloride is preferably used. However, an organic solvent containing no chloride is preferable in view of environmental problem. A combined use of the above described solvent and a lower alcohol such as methanol, ethanol or butanol is preferable in that solubility of the cellulose ester is increased and viscosity of the dope is reduced. Ethanol, which has a low boiling point and is less harmful, is especially preferable. A dope, in which the cellulose ester is dissolved in a mixture solvent containing a poor solvent such as lower alcohol or cyclohexanone in an amount of 5 to 30 weight % and the good solvents as described above, is cast on a metal support and easily gelled (solidified) to form a web, and the formed web can be peeled from the support in a short time, which can increase the film forming speed.

The cellulose ester dope for preparing the cellulose ester film of the invention does not substantially contain a low molecular weight plasticizer, a low molecular weight UV absorbent or a low molecular weight anti-oxidizing agent, and is a dope which contains a polymer. Accordingly, the invention has characteristics in that plasticizers, or UV absorbents do not ooze out of the web nor volatilize. However, the low molecular weight plasticizer, or UV absorbent may be optionally added to the cellulose ester dope in such a small amount that it does not ooze out of the web. In the invention, the low molecular weight plasticizer optionally added is not specifically limited, but is preferably a phosphate based compound, a phthalate based compound or a glycolate based compound. Examples of the phosphate based compound include triphenyl phosphate, tricresyl phosphate, cresyldiphenyl phosphate, octyldiphenyl phosphate, diphenylbiphenyl phosphate, trioctyl phosphate, or tributyl phosphate. Examples of the phthalate based compound include diethyl phthalate, dimethoxyethyl phthalate, dimethyl phthalate, dioctyl phthalate, dibutyl phthalate, di-2-ethylhexyl phthalate, butylbenzyl phthalate or dibenzyl phthalate. Examples of the glycolate based compound include butylphthalyl butyl glycolate, ethylphthalyl ethyl glycolate, or methylphthalyl ethyl glycolate. The above plasticizers can be used alone or as a mixture of two or more thereof. The content of the above plasticizers in the dope is preferably 3 to 10 weight %.

In the invention, a UV absorbent optionally added is not specifically limited, but is for example, an oxybenzophenone based compound, a benzotriazole based compound, a salicylic acid ester based compound, a benzophenone based compound, a cyanoacrylate based compound, and a nickel complex salt based compound, and is preferably a benzotriazole based compound which is less colored. As a UV absorbent, a benzotriazole based compound or a benzophenone based compound each having good light fastness is preferable, and of these, the benzotriazole based compound, which is less colored, is especially preferable. For example, TINUBIN 109, TINUBIN 171, TINUBIN 326, TINUBIN 327, or TINUBIN 328, each produced by Ciba Specialty Chemicals Co., Ltd., are preferably used. Since the low molecular weight UV absorbent may volatilize or precipitate on the web depending on its content of the dope, the low molecular weight UV absorbent content of the dope is preferably 3 to 10 weight %.

The cellulose ester film of the invention preferably contains an anti-oxidizing agent. Examples of the anti-oxidizing agent include hindered phenol compounds such as 2,6-di-t-butyl-p-cresol, pentaerythrityl-tetrakis[3-(3,5-di-t-butyl-4-hydroxyphenyl)propionate], triethylene glycol-bis[3-(3-t-butyl-5-methyl-4-hydroxyphenyl)propionate], 1,6-hexanediol-bis[3-(3,5-di-t-butyl-4-hydroxyphenyl) propionate], 2,4-bis-(n-octylthio)-6-(4-hydroxy-3,5-di-t-butylanilino)-1,3,5-triazine, 2,2-thio-diethylenebis[3-(3,5-di-t-butyl-4-hydroxyphenyl)propionate], octadecyl-3-(3,5-di-t-butyl-4-hydroxyphenyl)propionate, 1,3,5-trimethyl-2,4,6-tris(3,5-di-t-butyl-4-hydroxybenzyl)benzene, and tris-(3,5-di-t-butyl-4-hydroxybenzyl)-isocyanurate. Of these, 2,6-di-t-butyl-p-cresol, pentaerythrityl-tetrakis[3-(3,5-di-t-butyl-4-hydroxyphenyl)propionate], and triethylene glycol-bis[3-(3-t-butyl-5-methyl-4-hydroxyphenyl)propionate] are especially preferable. A metal-inactivating hydrazine compound such as N,N'-bis[3-(3,5-di-t-butyl-4-hydroxyphenyl) propionyl]-hydrazine or a phosphor-containing stabilizer such as (2,4-di-t-butylphenyl)phosphite can be used in combination. The content of these compounds in the cellulose ester film is preferably 1 ppm to 1.0% by weight, and more preferably 10 to 1000 ppm by weight based on the cellulose ester weight.

(Solution Casting Film Forming Process)

A method for preparing a cellulose ester film according to a solution casting film forming process will be explained below.

1) Dissolution process: The dissolution process is one in which cellulose ester (in the flake form), a polymer or additives are dissolved, while stirring, in organic solvents mainly comprised of good solvents for the cellulose ester, employing a dissolution vessel, and thereby a dope is prepared. In order to carry out said dissolution, there are various methods such as a method in which dissolution is carried out at a normal atmospheric pressure, a method in which dissolution is carried out at a temperature lower than the boiling point of the primary solvent, a method in which dissolution is carried out at a temperature higher than the boiling point of the main solvent under an increase of pressure, a cooling dissolution method, a method in which dissolution is carried out at a high pressure, and the like. The resultant dope is filtered employing filter materials, is then defoamed, and is subsequently pumped to the next process.

2) Casting process: The casting process is one in which a dope is conveyed to a pressure die through a pressure type metering gear pump, and cast from said pressure die onto a casting site of a moving endless metal belt such as a stainless steel belt or a metal support such as a rotating metal drum. The pressure die is preferred in which the slit shape at the mouth piece portion can be regulated and the film thickness is readily regulated to be uniform. Examples of the pressure die include a coat hanger die, a "T" die, and the like, and any of these is preferably employed. The surface of the metal support for casting is specular. In order to increase the casting speed, two or more pressure dies may be provided on the metal support and dopes divided into two or more may be simultaneously cast on the metal support.

3) Solvent evaporation process: The solvent evaporation process is one in which a web (formed after a dope is cast on a metal support) is heated on a metal support and solvents are evaporated till the web is capable of being peeled from the metal support. In order to evaporate solvents, methods include a method in which air is blown from the web side, and/or a method in which heating is carried out from the reverse surface of the support employing liquid, and a method in which heating is carried out from the surface as well as the revere surface employing heat radiation. Of these, the reverse surface liquid heating method is preferred due to high drying efficiency. Further, these methods are preferably combined. It is preferred in the reverse surface liquid heating method that the web is heated to a temperature lower than the boiling point of the primary solvent or a temperature lower than the boiling point of the organic solvent with the lowest boiling point.

4) Peeling process: The peeling process is one in which a web, which has been subjected to evaporation of solvents on the support, is peeled at the peeling site. The peeled web is conveyed to the subsequent process. When the residual solvent amount (refer to the formula described below) is too excessive it may be difficult to peel the web. On the contrary, when peeling is carried out after fully drying the web on the support, a part of the web may peel prior to the peeling site.

Listed as a method to increase the film forming speed is a gel casting method (in which peeling can be carried out even though the amount of residual solvents is relatively great). The gel casting methods include a method in which poor solvents with respect to the cellulose ester are added to a dope and gelling is carried out after casting said dope, and also a method in which gelling is carried out by decreasing the temperature of a metal support, and the like. By strengthening the web through gelling the dope on the metal support, it is possible to carry out earlier peeling and to increase the casting speed. The web on the metal support can be peeled at the time when the residual solvent amount is in the range of 5 to 150% depending on the drying conditions or the length of the metal support. However, when the peeling is carried out at the time when the residual solvent amount is still relatively great, the web may be too soft, which during peeling, the flatness of the web tends to be degraded, and wrinkles and longitudinal streaks due to the peeling tension tend to be formed. Accordingly, the residual solvent amount at the peeling is determined so that productivity and quality are balanced. It is preferred in the invention that at the peeling site on the metal support, temperature is 10 to 40° C., and preferably 15 to 35° C., and the residual solvent amount is 10 to 120 weight %. The residual solvent amount is expressed employing the formula described below:

Residual solvent amount (weight %)={($M-N$)/$N$}×100;

wherein M represents the weight of a web at an optional time, and N represents the weight of M after M has been dried at 110° C. for 3 hours.

In the invention, the residual solvent amount through the entire width of the web is defined as an average residual solvent amount. The residual solvent amount occasionally refers to that at the limited web portions such as the center and the edges of the web.

5) Drying process: The drying process is a process which dries a web employing a drying apparatus in which said web is alternatively passed through staggered rollers and/or a tenter apparatus in which said web is conveyed while holding both edges of the web employing clips. A common drying method is one in which both surfaces of the web are heated by heated air flow. Instead of the air flow, employed is a method in which heating is carried out employing microwaves. Too rapid drying tends to degrade the flatness of the finished film. During the entire drying process, drying temperature is commonly from 40 to 250° C. Drying temperature, drying time, and air volume for drying vary depending on employed solvents. Thus, drying conditions may be suitably selected depending on types of employed solvents and their combination.

In the method in the invention for preparing a cellulose ester dope, a cellulose ester is dissolved in an organic solvent capable of dissolving the cellulose ester to form a dope. A cellulose ester (in the flake form) is dissolved, while stirring, in an organic solvent mainly comprised of good solvents for the flakes, employing a dissolution vessel, and thereby a dope is prepared. In order to carry out said dissolution, there are various methods such as a method in which dissolution is carried out at a normal atmospheric pressure, a method in which dissolution is carried out at a temperature lower than the boiling point of the primary solvent, a method in which dissolution is carried out at a temperature higher than the boiling point of the main solvent under an increase of pressure, a cooling dissolution method as disclosed in Japanese Patent O.P.I. Publication Nos. 9-95544, 9-95557 and 9-95538, a method in which dissolution is carried out at a high pressure as disclosed in Japanese Patent O.P.I. Publication No. 11-21379, and the like. The resultant dope is filtered employing filter materials, is then defoamed, and is subsequently pumped to the next process. The cellulose ester content of the dope is preferably 10 to 35 weight %.

In the invention, a polymer UV absorbent prepared from an ethylenically unsaturated monomer having a UV absorbing group, which is available on the market, is preferably used. Examples of the monomer include 1-hydroxy-2-(2-benzotriazolyl)-4-(2-methacryloyloxyethyl)benzene (RUVA-93, produced by Otsuka Kagaku Co., Ltd.), and 1-hydroxy-2-(2-benzotriazolyl)-4-(2-acryloyloxyethyl)benzene.

In the invention, the cellulose ester film optionally contains a polymer (a polymer antistatic agent) having an antistatic group. Examples of the antistatic group of the polymer antistatic agent include a quaternary ammonium group, a sulfonate group, or a polyethyleneoxy group. The quaternary ammonium group is preferable in view of solubility or an antistatic property.

The content of the polymer antistatic agent in the cellulose ester film may be not more than 30 weight %, and is preferably 5 to 20 weight % based on the cellulose ester, in view of a water absorption property, durability, plasticity and an antistatic property.

The cellulose ester film of the invention preferably contains fine particles as a matting agent. When the cellulose ester film is used as a protective film of a polarizing plate, the presence of the fine particles in the cellulose ester film provides an optimal slip property and a good abrasion resistance. The fine particles are mixed or dispersed in the cellulose ester dope. Examples of fine particles include inorganic compounds such as silicon dioxide, titanium dioxide, aluminum oxide, zirconium oxide, calcium carbonate, kaolin, talc, burned calcium silicate, hydrated calcium silicate, aluminum silicate, magnesium silicate, and calcium phosphate, and cross-linked polymers. The fine particles are preferably silicon dioxide in providing a reduced haze. The secondary order particles of the fine particles have an average particle diameter of 0.01 to 1.0 µm, and the fine particle content of the film is preferably 0.005 to 0.3 weight %. The fine particles such as silicon dioxide particles are often surface treated with an organic compound, especially with a compound having a methyl group. Such surface treated fine particles are preferable in giving a reduced haze to the film. Examples of the organic compound used in the surface treatment include halogenated silanes, alkoxysilanes (especially, methylsilane), silazanes, and siloxanes. Fine particles having a larger average particle diameter has a high matting effect, and fine particles having a smaller average particle diameter has a good transparency. The primary order particles of the fine particles have an average particle diameter of preferably 5 to 50 nm, and more preferably 7 to 14 nm. It is preferred that the fine particles exist as aggregates in the cellulose ester film to provide a peak to valley distance of 0.01 to 1.0 µm on the film surface. The silicon dioxide fine particles are, for example, Aerosil 200, 200V, 300, R972, R972V, R974, R812, R202, OX50, or TT600 (each produced by Nihon Aerosil Co., Ltd.), and are preferably Aerosil R972, R972V, R974, R202 or R812. The fine particles may be used as a mixture of two or more kinds thereof at any amount ratio. Two matting agents different in material or average particle diameter from each other, for example, Aerosil 200V and R972 can be used in a 200V to R972 amount ratio of from 0.1:99.9 to 99.9:0.01.

The cellulose-ester film of the invention has an excellent retention property, an excellent dimensional stability, an excellent retardation, and an excellent (low) moisture vapor permeability, and minimizes foreign materials adhered thereto.

The retention property in the invention is evaluated according to the rate of mass change of the cellulose ester film. The retention property in the invention is preferably not more than 1.0%, more preferably not more than 0.5%, still more preferably not more than 0.1%, and most preferably zero.

The rate (defined later) of dimensional change of the cellulose ester film of the invention is reduced. The rate of dimensional change in the invention is preferably within the range of ±1.0%, more preferably within the range of ±0.5%, still more preferably within the range of ±0.4%, and still further more preferably within the range of ±0.3%.

The cellulose ester film of the invention provides excellent retardation without increase of the thickness on account of the polymer contained therein.

At least one surface of the cellulose ester film of the invention is saponified to obtain a protective film of a polarizing plate. The protective film is laminated onto at least one surface of a polarizing film described later to prepare a polarizing plate useful for a liquid crystal display.

In the saponification, for example, the surface of the cellulose ester film is immersed in an aqueous 2 mol/liter sodium hydroxide solution at 40 to 60° C. for 30 to 150 seconds, washed with water for 30 to 60 seconds, neutralized in an aqueous 1 to 5 weight % hydrochloric acid solution for 30 to 60 seconds, washed with water for 30 to 60 seconds, and dried at 80° C., but the invention is not limited thereto.

The polarizing film in the invention is manufactured by making a film from an aqueous solution of a polyvinyl alcohol type such as polyvinyl alcohol or ethylene-vinyl alcohol copolymer, uniaxially stretching the film, dyeing the stretched film with iodine or a two color type dye, further uniaxially stretching the dyed film, and then treating the film with a cross-linking agent such as a boron compound to provide water resistance.

The polarizing plate of the invention is prepared by adhering the cellulose ester film of the invention whose surface has been saponified as described above to at least one surface of the above-described polarizing film.

One embodiment for preparing the polarizing plate in the invention is as follows:

One side of each of two cellulose ester films, the surface of which has been saponified, is coated with a polyvinyl alcohol solution as an adhesive to form an adhesive layer, and a polarizing film obtained by uniaxially stretching a polyvinyl alcohol film, dyeing the stretched film with iodine, and further uniaxially stretching the dyed film, is sandwiched between the two above cellulose ester films so that the polarizing film contacts the adhesive layer. Thus, a polarizing plate is obtained. Examples of the adhesive include a polyvinyl alcohol based adhesive such as a polyvinyl alcohol solution or a polyvinyl butyral solution, and vinyl polymer latexes. A completely saponified polyvinyl alcohol solution is preferable as an adhesive.

The presence of foreign materials in the polarizing plate, in which the cellulose ester film is adhered to the stretched polyvinyl alcohol film, reduces its manufacture yield. Such foreign materials are observed as luminescent spots in polarizing plates arranged in a crossed Nicol state, and are readily identified as undesirable luminescent foreign materials. Thus, the polarizing plate is most preferably free from luminescent foreign materials. However, it is within the allowable range that the number of luminescent foreign materials having a size of 5 to 50 μm per 250 mm² of the polarizing plate is not more than 200 and the number of luminescent foreign materials having a size exceeding 50 μm per 250 mm² of the polarizing plate is 0. The number of luminescent foreign materials having a size of 5 to 50 μm per 250 mm² of the polarizing plate is preferably not more than 100, and more preferably not more than 50. The presence of some foreign materials in the cellulose ester film depends on the filtration precision of the cellulose ester dope from which the cellulose ester film is formed.

When a polarizing plate is stored at high temperature and high humidity, there may occur phenomenon that the edges of the plate turn white, but such phenomenon scarcely occurs in the polarizing plate of the invention.

A cellulose ester film is applied to a polarizing plate of a liquid crystal display, and the polarizing plate is required to be thinner and lighter. The thickness of the cellulose ester film of the invention is preferably 30 to 150 μm, and more preferably 35 to 85 μm. The cellulose ester film of the invention is used in a liquid crystal display, for example, in a polarizing plate, a protective film of a polarizing plate, a phase difference film, a reflection plate, a viewing angle increasing film, an antiglare film, a non-reflective film, or an antistatic film. The cellulose ester film of the invention is especially preferably applied to a polarizing plate, a protective film of a polarizing plate, a phase difference film, or a viewing angle increasing film, each requiring excellent dimensional stability.

EXAMPLES

The invention will be detailed according to the following examples, but is not limited thereto.

Examples 1 to 11

(Preparation of Cellulose Triacetate Film Samples 1 to 11)

| (Dope compositions 1 to 11) | |
| --- | --- |
| Cellulose triacetate with an acetyl substitution degree of 2.88 (a number average molecular weight: 150,000) | 100 weight parts |
| 2-(2'-hydroxy-3',5'-di-t-butylphenyl) benzotriazole | 2 weight parts |
| One of polymers 1 to 11 synthesized as described below | 15 weight parts |
| Methylene chloride | 475 weight parts |
| Ethanol | 50 weight parts |

Each of dope compositions 1 to 11 was incorporated in a sealed vessel, and stirred at 70° C. to obtain a cellulose triacetate (TAC) dope (hereinafter referred to simply as a dope). The dissolution time was 4 hours. The resulting dope was filtered. The filtered dope of 35° C. was uniformly cast on a 22° C. stainless steel belt support employing a belt casting apparatus to form a web, and dried until peeling of the web from the stainless steel belt was possible. At peeling the residual solvent of the web was 25% by weight. The time taken from the dope casting to the peeling was 3 minutes. After the web was peeled from the stainless steel belt, the web was dried at 120° C., while holding both width ends of the web. The holding being released, the web was dried at a 120° C. drying zone, and subsequently at a 135° C. drying zone, while passing through many rollers to form a film. The dried film was subjected to knurling treatment of a 10 mm width and a 5μ height at both ends thereof to obtain a cellulose triacetate film with a thickness of 40 μm. The film was wound on a core at a width of 1300 mm and at a length of 3000 m. The winding tension was 15 kg/1500 mm at initial winding stage, and was 10 kg/1500 mm at final winding stage. Thus, cellulose triacetate film samples 1 to 11 were obtained.

(Preparation of Polarizing Plate)

Each of the cellulose triacetate film samples obtained above was alkali-processed with an aqueous 2.5N sodium hydroxide solution at 40° C. for 60 seconds to form a saponified layer, washed with water for 3 minutes, and dried to obtain an alkali-processed film sample. A 120 μm thick polyvinyl alcohol film was immersed in 100 weight parts of an aqueous solution containing 1 weight part of iodine and 4 weight parts of boric acid, and stretched at 50° C. by a factor of four to obtain a polarizing film. Each of the cellulose triacetate film samples alkali-processed above was adhered to both surfaces of the polarizing film through an adhesive, an aqueous 5% completely saponified polyvinyl alcohol solution. Thus, polarizing plate samples 1 to 11 were obtained.

(Synthesis of Polymers)

| (Preparation of polymer 1) | |
|---|---|
| Methyl acrylate | 8 weight parts |
| 2-Hydroxyethyl acrylate | 1 weight part |
| AIBN | 1 weight part |
| Toluene | 30 weight parts |

The above composition was polymerized by solution polymerization, and the solvent was removed to obtain polymer 1 with a weight average molecular weight (hereinafter referred to as Mw) of 5000.

| (Preparation of polymer 2) | |
|---|---|
| Methyl acrylate | 8 weight parts |
| 2-Hydroxyethyl acrylate | 1 weight part |
| AIBN | 2 weight parts |
| Toluene | 30 weight parts |

The above composition was polymerized by solution polymerization, and the solvent was removed to obtain polymer 2 with an Mw of 2000.

| (Preparation of polymer 3) | |
|---|---|
| Methyl acrylate | 10 weight parts |
| AIBN | 2 weight parts |
| Toluene | 30 weight parts |

The above composition was polymerized by solution polymerization, and the solvent was removed to obtain polymer 3 with an Mw of 2000.

| (Preparation of polymer 4) | |
|---|---|
| Methyl methacrylate | 8 weight parts |
| 2-Hydroxyethyl methacrylate | 1 weight part |
| AIBN | 2 weight parts |
| Toluene | 30 weight parts |

The above composition was polymerized by solution polymerization, and the solvent was removed to obtain polymer 4 with an Mw of 2000.

| (Preparation of polymer 5) | |
|---|---|
| Methyl acrylate | 3 weight parts |
| Ethyl acrylate | 6 weight parts |
| 2-Hydroxyethyl acrylate | 1 weight part |
| AIBN | 2 weight parts |
| Toluene | 30 weight parts |

The above composition was polymerized by solution polymerization, and the solvent was removed to obtain polymer 5 with an Mw of 2000.

| (Preparation of polymer 6) | |
|---|---|
| Methyl methacrylate | 3 weight parts |
| Ethyl methacrylate | 6 weight parts |
| 2-Hydroxyethyl methacrylate | 1 weight part |
| AIBN | 2 weight parts |
| Toluene | 30 weight parts |

The above composition was polymerized by solution polymerization, and the solvent was removed to obtain polymer 6 with an Mw of 2000.

(Preparation of Polymer 7)

A methyl acrylate monomer was polymerized according to a method described in Example 1 of Japanese Patent O.P.I. Publication No. 2000-344823 and polymerized to obtain a polymer 7 with an Mw of 3400, and a number average molecular weight (hereinafter referred to as Mn) of 2800.

(Preparation of Polymer 8)

A methyl acrylate monomer was polymerized according to a polymerization method described in Example 3 of Japanese Patent O.P.I. Publication No. 2000-128911 to obtain a polymer 8 with an Mw of 2100 and an Mn of 1400. Polymer 8 had a hydroxyl value (OHV; mg/g KOH) of 50.

(Preparation of Polymer 9)

The following monomer composition was polymerized according to a polymerization method described in Example 3 of Japanese Patent O.P.I. Publication No. 2000-128911 to obtain polymer 9 with an Mw of 1800, and an Mn of 1200. Polymer 9 had a hydroxyl value (OHV; mg/g KOH) of 35.

| Monomer composition | |
|---|---|
| Methyl acrylate | 7 weight parts |
| Benzyl methacrylate | 3 weight parts |

(Preparation of Polymer 10)

A vinyl acetate monomer was polymerized according to a polymerization method described in Example 3 of Japanese Patent O.P.I. Publication No. 2000-128911 to obtain polymer 10 with an Mw of 4500, and an Mn of 3500. Polymer 10 had a hydroxyl value (OHV; mg/g KOH) of 20.

(Preparation of Polymer 11)

The following monomer composition was polymerized according to a polymerization method described in Example 3 of Japanese Patent O.P.I. Publication No. 2000-128911 to obtain polymer 11 with an Mw of 4000, and an Mn of 3000. Polymer 11 had a hydroxyl value (OHV; mg/g KOH) of 47.

| Monomer composition | |
|---|---|
| Vinyl acetate | 7 weight parts |
| Vinyl benzoate | 3 weight parts |

Comparative Example 1

(Preparation of Cellulose Triacetate Film Sample 12)

| (Dope composition 12) | |
|---|---|
| Cellulose triacetate with an acetyl substitution degree of 2.88 (a number average molecular weight: 150,000) | 100 weight parts |
| 2-(2'-hydroxy-3',5'-di-t-butylphenyl) benzotriazole | 1 weight part |
| Triphenyl phosphate | 15 weight parts |
| Methylene chloride | 475 weight parts |
| Ethanol | 50 weight parts |

Dope composition 12 was processed according to an ordinary method to obtain a cellulose triacetate dope. The resulting dope was filtered. The filtered dope of 35° C. was uniformly cast on a support employing a belt casting apparatus to give a dry thickness of 40 μm. The cast dope was dried at 80° C. for 3 minutes, peeled and further dried at 120° C. for 10 minutes to form a film. The dried film was subjected to knurling treatment of a 10 mm width and a 5μ height at both ends thereof to obtain a cellulose triacetate film sample 12 with a thickness of 40 μm. The film sample 12 was wound on a core at a width of 1300 mm and at a length of 2000 m.

Comparative Example 2

(Preparation of Cellulose Triacetate Film Sample 13)

A cellulose triacetate film sample 13 was prepared in the same manner as in Comparative Example 1 above, except that the dope composition was replaced with the following dope composition 13.

| (Dope composition 13) | |
|---|---|
| Cellulose triacetate with an acetyl substitution degree of 2.88 (a number average molecular weight: 150,000) | 100 weight parts |
| 2-(2'-hydroxy-3',5'-di-t-butylphenyl) benzotriazole | 1 weight part |
| Ethylphthalyl ethyl glycolate | 4 weight parts |
| Methylene chloride | 475 weight parts |
| Ethanol | 50 weight parts |

Comparative Example 3

(Preparation of Cellulose Triacetate Film Sample 14)

A cellulose triacetate film sample 14 was prepared in the same manner as in Comparative Example 1 above, except that the dope composition was replaced with the following dope composition 14.

| (Dope composition 14) | |
|---|---|
| Cellulose triacetate with an acetyl substitution degree of 2.88 (a number average molecular weight: 150,000) | 100 weight parts |
| 2-(2'-hydroxy-3',5'-di-t-butylphenyl) benzotriazole | 1 weight part |
| Triphenyl phosphate | 10 weight parts |
| Lauryl benzene sulfonate | 2 weight parts |
| Methylene chloride | 475 weight parts |
| Ethanol | 50 weight parts |

(Preparation of Polarizing Plates 12 to 14)

The cellulose triacetate film samples 12 to 14 obtained above were alkali-processed in the same manner as described above. Polarizing plate samples 12 to 14 were prepared in the same manner as above, except that alkali-processed film samples 12 to 14 were used.

(Evaluation)

The film samples 1 to 14 and polarizing plate samples 1 to 14 obtained above were evaluated according to the following methods.

(1) Dimensional Stability (Rate (%) of Dimensional Change)

Two points were marked with the symbol "+" on the film surface in each of the longitudinal direction (MD) and transverse direction (TD), and the resulting film was heat treated at 80° C. and at 90% RH for 50 hours. The distances before and after the heat treatment between the two points on the film surface were measured by means of a factory microscope. The rate of dimensional change is represented by the following formula:

$$\text{Rate (\%) of dimensional change} = \{(a1-a2)/a1\} \times 100$$

wherein a1 represents the distance before the heat treatment between the two points, and a2 represents the distance after the heat treatment between the two points.

(2) Retardation (Rt)

Refractive indices at wavelength 590 nm in the three axis directions, Nx, Ny, and Nz of the film samples were measured by means of a birefringence meter KOBRA-21AH (produced by Oji Keisokukiki Co., Ltd.) at 23° C. and 55% RH.

Retardation (Rt) in the thickness direction is obtained from the following formula:

$$Rt = \{(Nx+Ny)/2 - Nz\} \times d$$

wherein Nx represents the refractive index in the longitudinal direction in the plane of the film, Ny represents the refractive index in the direction perpendicular to the longitudinal direction in the plane of the film, Nz represents the refractive index in the thickness direction of the film; and d represents the film thickness (nm)

(3) Retention Property (Precipitation of Plasticizer)

Each of the film samples was cut to a size of 10 cm in the transverse direction and 10 cm in the longitudinal direction to obtain a film sample with a size of 10×10 cm². The sample was allowed to stand at 23° C. and at 55% RH for 24 hours, and weighed. Then, the sample was subjected to heat treatment in which the sample was stored at 80° C. and at 90% RH for 48 hours, and again allowed to stand at 23° C. and at 55% RH for 24 hours, and then weighed. The retention property is represented by the following formula:

Retention property (%) =|Film weight before heat treatment−Film weight after heat treatment|×100/ Film weight before heat treatment (4) Moisture Vapor Permeability Moisture vapor transmittance of the film samples was measured under conditions of 80±5° C. and 90±5% RH according to a method described in JIS Z 0208.

(5) Foreign Materials or Stains

Each of the film samples was cut with a size of 1×1 m². Foreign materials or stains on the surface of the film sample were observed with a 5-powered magnifier. The film sample was evaluated according to the following evaluation criteria:
A: No foreign materials or stains having a size of not less than 50 μm were observed, but 0 to 49 foreign materials or stains having a size of less than 50 μm were observed.
B: No foreign materials or stains having a size of not less than 50 μm were observed, but not less than 50 foreign materials or stains having a size of less than 50 μm were observed.
C: One to nine foreign materials or stains having a size of not less than 50 μm were observed.
D: Not less than 10 foreign materials or stains having a size of not less than 50 μm were observed.

Rating A and B are not problematic for practical use.

(6) Durability of Polarizing Plate

Two polarizing plates with a size of 10×10 cm² per each polarizing plate sample were cut, heat treated at 80° C. and 90% RH for 50 hours, and then arranged to be perpendicular to each other (in a crossed Nicol state). In the resulting polarizing plates, the plate edges on the central line in the direction longer of the longitudinal direction and the transverse direction turned white. The length of one edge turning white was measured, and the polarizing plate samples were evaluated according to the following evaluation criteria.

The expression "turned white" means a phenomenon that the edges of the two polarizing plates arranged in a crossed Nicol state transmit light and therefore, turn white. The phenomenon can be easily judged by visual observation. The phenomenon causes trouble that images at edge portions are not displayed in a polarizing plate.
A: The length of one edge turning white was less than 5%.
B: The length of one edge turning white was from 5% to less than 10%.
C: The length of one edge turning white was from 10 to less than 20%.
D: The length of one edge turning white was not less than 20%.

Ratings A, B and C are not problematic for a polarizing plate. Rating D is problematic for practical use.

The results are shown in Table 1.

TABLE 1

| Film sample No. | Retardation (nm) | Retention Property (%) | Moisture vapor permeability (g/m²·24 hr) | Dimensional stability (%) * | Dimensional stability (%) ** | Foreign materials or stains (rating) | Durability (rating) of polarizing plate | Remarks |
|---|---|---|---|---|---|---|---|---|
| 1 | 7 | 0.5 | 220 | −0.05 | −0.02 | A | A | Inv. |
| 2 | 10 | 0.7 | 215 | −0.06 | −0.04 | A | A | Inv. |
| 3 | 8 | 0.8 | 213 | −0.09 | −0.07 | A | A | Inv. |
| 4 | 15 | 1.0 | 230 | −0.05 | −0.04 | A | A | Inv. |
| 5 | 13 | 0.9 | 220 | −0.08 | −0.10 | A | A | Inv. |
| 6 | 7 | 0.7 | 217 | −0.06 | −0.04 | A | A | Inv. |
| 7 | 5 | 0.2 | 210 | −0.03 | −0.02 | A | A | Inv. |
| 8 | 7 | 0.3 | 205 | −0.02 | −0.01 | A | A | Inv. |
| 9 | 9 | 0.4 | 200 | −0.03 | −0.01 | A | B | Inv. |
| 10 | 18 | 1.2 | 240 | −0.06 | −0.03 | A | A | Inv. |
| 11 | 16 | 1.5 | 230 | −0.06 | −0.03 | A | A | Inv. |
| 12 | 35 | 7.0 | 290 | −0.34 | −0.44 | C | D | Comp. |
| 13 | 28 | 3.0 | 320 | −0.30 | −0.40 | C | D | Comp. |
| 14 | 33 | 5.2 | 300 | −0.29 | −0.42 | C | D | Comp. |

In Table 1, "Inv." represents "Invention", "Comp." represents "Comparative", symbol "*" represents "in the longitudinal direction", and symbol "**" represents "in the transverse direction".

As is apparent from Table 1 above, inventive cellulose ester film samples minimize foreign materials or stains, which result in defects of the protective film of conventional polarizing plates, and inventive polarizing plate samples provide excellent durability.

Example 21

| (Dope composition 21) | |
|---|---|
| Cellulose triacetate with an acetyl substitution degree of 2.88 (a number average molecular weight: 150,000) | 100 weight parts |
| Vinyl acetate | 5 weight parts |
| Vinyl laurate | 5 weight parts |
| Benzoin | 1 weight part |
| AEROSIL R972V | 0.1 weight parts |
| Methylene chloride | 475 weight parts |
| Ethanol | 25 weight parts |

Example 22

| (Dope composition 22) | |
|---|---|
| Cellulose triacetate with an acetyl substitution degree of 2.88 (a number average molecular weight: 150,000) | 100 weight parts |
| Vinyl acetate | 4 weight parts |
| Vinyl stearate | 5 weight parts |

-continued (Dope composition 22)

| | |
|---|---|
| UVM-1 | 3 weight parts |
| Diethoxy Benzophenone | 1 weight part |
| AEROSIL 200V | 0.1 weight parts |
| Methylene chloride | 475 weight parts |
| Ethanol | 25 weight parts |

Example 23

(Dope composition 23)

| | |
|---|---|
| Cellulose triacetate with an acetyl substitution degree of 2.88 (a number average molecular weight: 150,000) | 100 weight parts |
| UVM-5 | 7 weight parts |
| UVM-1 | 3 weight parts |
| Benzoin | 1 weight part |
| AEROSIL R972V | 0.1 weight parts |
| Methylene chloride | 475 weight parts |
| Ethanol | 25 weight parts |

Example 24

(Dope composition 24)

| | |
|---|---|
| Cellulose triacetate with an acetyl substitution degree of 2.88 (a number average molecular weight: 150,000) | 100 weight parts |
| Methyl acrylate | 5 weight parts |
| Vinyl acetate | 2 weight parts |
| ASM-2 | 3 weight parts |
| Benzoin | 1 weight part |
| AEROSIL R972V | 0.1 weight parts |
| Methylene chloride | 475 weight parts |
| Ethanol | 25 weight parts |

Example 25

(Dope composition 25)

| | |
|---|---|
| Cellulose triacetate with an acetyl substitution degree of 2.88 (a number average molecular weight: 150,000) | 100 weight parts |
| Vinyl acetate | 4 weight parts |
| Vinyl stearate | 3 weight parts |
| Benzyl acrylate | 2 weight parts |
| Methyl acrylate | 1 weight part |
| Diethoxy Benzophenone | 1 weight part |
| AEROSIL R972V | 0.1 weight parts |
| Methylene chloride | 475 weight parts |
| Ethanol | 25 weight parts |

Example 26

(Dope composition 26)

| | |
|---|---|
| Cellulose triacetate with an acetyl substitution degree of 2.88 (a number average molecular weight: 150,000) | 100 weight parts |
| Vinyl acetate | 5 weight parts |
| ASM-4 | 3 weight parts |
| ASM-1 | 2 weight parts |
| Benzyl acrylate | 0.5 weight parts |
| Diethoxy Benzophenone | 1 weight part |
| AEROSIL 200V | 0.1 weight parts |
| Methylene chloride | 475 weight parts |
| Ethanol | 25 weight parts |

Example 27

(Dope composition 27)

| | |
|---|---|
| Cellulose triacetate with an acetyl substitution degree of 2.88 (a number average molecular weight: 150,000) | 100 weight parts |
| Vinyl acetate | 4 weight parts |
| Vinyl stearate | 3 weight parts |
| UVM-1 | 3 weight parts |
| M-1310 (urethane acrylate produced by Toa Gosei Kagaku Co., Ltd.) | 1 weight part |
| Methyl acrylate | 0.5 weight part |
| Diethoxy Benzophenone | 1 weight part |
| AEROSIL R972V | 0.1 weight parts |
| Methylene chloride | 475 weight parts |
| Ethanol | 25 weight parts |

Example 28

(Dope composition 28)

| | |
|---|---|
| Cellulose acetate propionate with an acetyl substitution degree of 2.00 and a propionyl substitution degree of 0.80 (a number average molecular weight: 100,000) | 100 weight parts |
| Ethylenebis(3,4-epoxycyclohexane-carboxylate) | 7 weight parts |
| Trimethylolpropane triglycidyl ether | 5 weight parts |
| 4,4'-Bis{di(β-hydroxyethoxy)phenyl-sulfonio}phenylsulfide-bishexafuluoro antimonate | 1 weight part |
| AEROSIL 200V | 0.1 weight parts |
| Methyl acetate | 475 weight parts |
| Ethanol | 25 weight parts |

Example 29

(Dope composition 29)

| | |
|---|---|
| Cellulose acetate propionate with an acetyl substitution degree of 2.00 and a propionyl substitution degree of 0.80 (a number average molecular weight: 100,000) | 100 weight parts |
| Trimethylolpropane triglycidyl ether | 7 weight parts |
| Ethylenebis(3,4-epoxycyclohexane-carboxylate) | 4 weight parts |
| UVE-1 | 2 weight parts |
| 4,4'-Bis{di(β-hydroxyethoxy)phenyl-sulfonio}phenylsulfide-bishexafuluoro antimonate | 3 weight parts |
| AEROSIL 200V | 0.1 weight parts |
| Methyl acetate | 475 weight parts |
| Ethanol | 25 weight parts |

Example 30

(Dope composition 30)

| | |
|---|---|
| Cellulose acetate propionate with an acetyl substitution degree of 2.00 and a propionyl substitution degree of 0.80 (a number average molecular weight: 100,000) | 100 weight parts |
| Trimethylolpropane triglycidyl ether | 5 weight parts |
| Ethylenebis(3,4-epoxycyclohexane-carboxylate) | 4 weight parts |
| UVE-1 | 3 weight parts |
| 4,4'-Bis{di(β-hydroxyethoxy)phenyl-sulfonio}phenylsulfide-bishexafuluoro antimonate | 3 weight parts |
| AEROSIL 200V | 0.1 weight parts |
| Methyl acetate | 475 weight parts |
| Ethanol | 25 weight parts |

Example 31

(Dope composition 31)

| | |
|---|---|
| Cellulose acetate propionate with an acetyl substitution degree of 2.00 and a propionyl substitution degree of 0.80 (a number average molecular weight: 100,000) | 100 weight parts |
| UVE-1 | 8 weight parts |
| 4,4'-Bis{di(β-hydroxyethoxy)phenyl-sulfonio}phenylsulfide-bishexafuluoro antimonate | 3 weight parts |
| AEROSIL R972V | 0.1 weight parts |
| Methyl acetate | 475 weight parts |
| Ethanol | 25 weight parts |

Example 32

(Dope composition 32)

| | |
|---|---|
| Cellulose triacetate with an acetyl substitution degree of 2.88 (a number average molecular weight: 150,000) | 100 weight parts |
| P-1 | 10 weight parts |
| AEROSIL 200V | 0.1 weight parts |
| Methylene chloride | 475 weight parts |
| Ethanol | 25 weight parts |

Example 33

(Dope composition 33)

| | |
|---|---|
| Cellulose triacetate with an acetyl substitution degree of 2.88 (a number average molecular weight: 150,000) | 100 weight parts |
| UVP-1 | 10 weight parts |
| AEROSIL R972V | 0.1 weight parts |
| Methylene chloride | 475 weight parts |
| Ethanol | 25 weight parts |

Example 34

(Dope composition 34)

| | |
|---|---|
| Cellulose triacetate with an acetyl substitution degree of 2.88 (a number average molecular weight: 150,000) | 100 weight parts |
| ASP-1 | 10 weight parts |
| AEROSIL R972 | 0.1 weight parts |
| Methylene chloride | 475 weight parts |
| Ethanol | 25 weight parts |

Example 35

(Dope composition 35)

| | |
|---|---|
| Cellulose triacetate with an acetyl substitution degree of 2.88 (a number average molecular weight: 150,000) | 100 weight parts |
| P-3 (x/y = 80/20 by weight, a weight average molecular weight: 56,000) | 4 weight parts |
| UVP-3 (x/y = 60/40 by weight, a weight average molecular weight: 35,000) | 4 weight parts |
| ASP-2 (x/y = 60/40 by weight, a weight average molecular weight: 21,000) | 3 weight parts |
| AEROSIL R972V | 0.1 weight parts |
| Methylene chloride | 475 weight parts |
| Ethanol | 25 weight parts |

Example 36

(Dope composition 36)

| | |
|---|---|
| Cellulose triacetate with an acetyl substitution degree of 2.88 (a number average molecular weight: 150,000) | 100 weight parts |
| P-3 (x/y = 80/20 by weight, a weight average molecular weight: 56,000) | 7 weight parts |
| ASP-1 | 3 weight parts |
| AEROSIL R972V | 0.1 weight parts |
| Methylene chloride | 475 weight parts |
| Ethanol | 25 weight parts |

Example 37

(Dope composition 37)

| | |
|---|---|
| Cellulose triacetate with an acetyl substitution degree of 2.88 (a number average molecular weight: 150,000) | 100 weight parts |
| P-11 (a weight average molecular weight: 54,000) | 10 weight parts |
| AEROSIL R972V | 0.1 weight parts |
| Methylene chloride | 475 weight parts |
| Ethanol | 25 weight parts |

Example 38

(Dope composition 38)

| | |
|---|---|
| Cellulose triacetate with an acetyl substitution degree of 2.88 (a number average molecular weight: 150,000) | 100 weight parts |
| P-12 (a weight average molecular weight: 38,500) | 10 weight parts |
| AEROSIL R972V | 0.1 weight parts |
| Methylene chloride | 475 weight parts |
| Ethanol | 25 weight parts |

Comparative Example 4

(Dope composition 39)

| | |
|---|---|
| Cellulose triacetate with an acetyl substitution degree of 2.88 (a number average molecular weight: 150,000) | 100 weight parts |
| Triphenyl phosphate | 10 weight parts |
| Ethylphthalylethyl glycolate | 2 weight parts |
| TINUVIN 326 (produced by Ciba Geigy Specialty Chamicals Co., Ltd.) | 1 weight part |
| AEROSIL R972V | 0.1 weight parts |
| Methylene chloride | 475 weight parts |
| Ethanol | 25 weight parts |

Comparative Example 5

(Dope composition 40)

| | |
|---|---|
| Cellulose triacetate with an acetyl substitution degree of 2.88 (a number average molecular weight: 150,000) | 100 weight parts |
| Triphenyl phosphate | 10 weight parts |
| Ethylphthalylethyl glycolate | 2 weight parts |
| Trimethylcetylammonium chloride | 8 weight parts |
| AEROSIL 200V | 0.1 weight parts |
| Methylene chloride | 475 weight parts |
| Ethanol | 25 weight parts |

Comparative Example 6

(Dope composition 41)

| | |
|---|---|
| Cellulose triacetate with an acetyl substitution degree of 2.88 (a number average molecular weight: 150,000) | 100 weight parts |
| Vinyl acetate | 5 weight parts |
| Vinyl laurate | 5 weight parts |
| AEROSIL R972V | 0.1 weight parts |
| Methylene chloride | 475 weight parts |
| Ethanol | 25 weight parts |

Comparative Example 7

(Dope composition 42)

| | |
|---|---|
| Cellulose acetate propionate with an acetyl substitution degree of 2.00 and a propionyl substitution degree of 0.80 (a number average molecular weight: 100,000) | 100 weight parts |
| Ethylenebis(3,4-epoxycyclohexane-carboxylate) | 8 weight parts |
| Trimethylolpropane triglycidyl ether | 6 weight parts |
| AEROSIL R972V | 0.1 weight parts |
| Methyl acetate | 475 weight parts |
| Ethanol | 25 weight parts |

Comparative Example 8

(Dope composition 43)

| | |
|---|---|
| Cellulose acetate propionate with an acetyl substitution degree of 2.00 and a propionyl substitution degree of 0.80 (a number average molecular weight: 100,000) | 100 weight parts |
| Triphenyl phosphate | 10 weight parts |
| Ethylphthalylethyl glycolate | 2 weight parts |
| TINUVIN 326 (produced by Ciba Geigy Specialty Chamicals Co., Ltd.) | 1 weight part |
| Benzyltrimethylammonium chloride | 1 weight part |
| AEROSIL R972V | 0.1 weight parts |
| Methylene chloride | 475 weight parts |
| Ethanol | 25 weight parts |

(Preparation of Film)

Each of dope compositions 21 to 38 in Examples 21 through 38 above and dope compositions 39 to 43 in Comparative examples 4 through 8 above was processed as follows to obtain a dope. Each composition was incorporated in a pressurized sealed vessel, and stirred at 45° C. and 1.2 atmospheres to obtain a cellulose ester dope (hereinafter referred to simply as a dope). The dope was cooled at 35° C., allowed to stand overnight, filtered employing Azumi filter paper No. 244, produced by Azumi Roshi Co., Ltd., and further allowed to stand overnight to defoam. The resulting dope was filtered at a filtration pressure of $1.0 \times 10^6$ Pa, employing Finemet NM with an absolute filtration precision of 100 µm, Finepore NF with an absolute filtration precision of 50 µm, Finepore NF with an absolute filtration precision of 15 µm, and Finepore NF with an absolute filtration precision of 5 µm (each filter paper produced by Nihon Seisen Co., Ltd.) in that order. The filtered dope of 35° C. was cast on a 22° C. endless stainless steel belt from a die of a hanger type to form a web on the stainless steel belt. In preparing films from the dope compositions 21 to 31 of Examples 21 through 31, the web formed on the stainless steel was irradiated with 8 high pressure mercury lamps of 8 kW 15 cm distant from the web surface while blowing 40° C. air, whereby polymerization was initiated to produce a polymer in the web. The high pressure mercury lamps are equipped with a reflection plate and a cooling device. The irradiation amount at any point on the surface of the web was 300 mj/cm². In preparing films from the dope compositions 32 to 38 of Examples 32 through 38 and from the dope compositions 39 to 43 of Comparative examples 4 through 8, 40° C. air was blown onto the web surface at a rate of 10 m/second in the moving direction at an angle of 40° from the die side over the stainless steel belt. The web was peeled from the belt at the time when the residual solvent amount in the web was 25 weight %, passed through three rollers, incorporated in a tenter drying chamber as disclosed in Japanese Patent O.P.I. Publication No. 62-115035, dried at 90 to 115° C. while holding both ends of the web with a pin clip, further dried at 110 to 130° C. in a roller drying chamber to give a residual solvent amount of 0.2 weight %, and then wound on a core. Thus, cellulose ester film samples 21 to 43 with a thickness of 60 µm were obtained.

(Preparation of Polarizing Plate)

The cellulose ester films obtained above were saponified with an aqueous 2.5 mol/liter sodium hydroxide solution at 40° C. for 60 seconds, washed and dried. A 120 µm thick polyvinyl alcohol film was immersed in 100 weight parts of an aqueous solution containing 1 weight part of iodine and 4 weight parts of boric acid, and stretched at 50° C. by a factor of four in the longitudinal direction to obtain a polarizing film. Each of the cellulose ester films saponified as above was adhered to both surfaces of the polarizing film employing an adhesive an aqueous 5% completely saponified polyvinyl alcohol solution. Thus, polarizing plate samples 21 to 43 were obtained.

(Evaluation)

(Dimensional Stability)

The cellulose ester films before saponification were allowed to stand at 23° C. and at 55% RH for 24 hours, and two points on the film surface 100 mm distant from each other were marked with the symbol "+" in each of the longitudinal and transverse directions. The distance (a) between the two points was accurately measured at 23° C. and at 55% RH. The resulting cellulose ester films were heat treated at 80° C. and at 90% RH for 50 hours, again allowed to stand at 23° C. and at 55% RH for 24 hours, and the distance (b) between the two points was accurately measured at 23° C. and at 55% RH. The distances were measured with a cathetometer, and the rate of dimensional change was evaluated for dimensional stability. The rate of dimensional change is represented by the following formula:

$$\text{Rate of dimensional change (\%)} = \{(b-a)/a\} \times 100$$

wherein a represents the distance before the heat treatment between the two points on the film surface, and b represents the distance after the heat treatment between the two points on the film.

(Rate of Water Absorption)

The cellulose ester films before saponification were allowed to stand at 30° C. and at 85% RH for 3 hours, and weighed as "d". The films were heat treated at 110° C. for 3 hours, and cooled not to absorb water, and weighed as "c". The rate of water absorption is represented by the following formula:

$$\text{Rate of water absorption (\%)} = \{(d-c)/c\} \times 100$$

(Measurement of Retardation)

Refractive indices at wavelength 590 nm in three axis directions, nx, ny, and nz of the cellulose ester films were measured by means of a birefringence meter KOBRA-21ADH (produced by Oji Keisokukiki Co., Ltd.) at 23° C. and 55% RH. Retardation (Rt) is obtained from the following formula:

$$Rt(nm) = \{(nx+ny)/2 - nz\} \times d$$

wherein nx represents the refractive index in the longitudinal direction in the plane of the film, ny represents the refractive index in the transverse direction in the plane of the film, and nz represents the refractive index in the thickness direction of the film.

(UV Absorption Property)

UV absorption of each cellulose ester film sample was measured employing light having a wavelength of 350 nm, and represented as 100 for control. UV absorption of each cellulose ester film sample after storage at 80° C. and 90% RH for 50 hours was measured in the same manner as above. The UV absorption ratio of the film after storage to the film before storage was represented by %, whereby UV absorption property was evaluated. Regarding the cellulose ester film samples containing neither a UV absorbent nor a compound having a UV absorbing group in Table 1 described later, UV absorption was not measured.

(Foreign Materials or Stains)

One meter in the longitudinal direction of each of the films was cut and placed on a viewing box, and foreign materials or stains on the film were observed with a magnifier through a transmitting light. The films were evaluated according to the following evaluation criteria:

A: No foreign materials or stains having a size of not less than 50 µm were observed, but 0 to 10 foreign materials or stains having a size of less than 50 µm were observed.

B: No foreign materials or stains having a size of not less than 50 µm were observed, but 11 to 30 foreign materials or stains having a size of less than 50 µm were observed.

C: One to ten foreign materials or stains having a size of not less than 50 µm were observed, and 31 to 50 foreign materials or stains having a size of less than 50 µm were observed.

D: Eleven to thirty foreign materials or stains having a size of not less than 50 μm were observed, and 51 to 99 foreign materials or stains having a size of less than 50 μm were observed.

E: Not less than 31 foreign materials or stains having a size of not less than 50 μm were observed, but not less than 100 foreign materials or stains having a size of less than 50 μm were observed.

(Durability of Polarizing Plate)

Two polarizing plates with a size of 100×100 mm² per each polarizing plate were cut, stored at 80° C. and 90% RH for 50 hours, and then arranged in a crossed Nicol state. The area of light transmitting portions, appearing at the edges of the resulting polarizing plates in a crossed Nicol state, was observed and compared to the total area of the plates. The polarizing plate samples were evaluated according to the following evaluation criteria:

A: No light transmitting portions were observed.

B: The area of the light transmitting portions was less than 2% based on the total area of the polarizing plate.

C: The area of the light transmitting portions was 2 to less than 5% based on the total area of the film.

D: The area of the light transmitting portions was 5 to less than 10% based on the total area of the film.

E: The area of the light transmitting portions was not less than 10% based on the total area of the film.

(Foreign Materials of Polarizing Plate Samples)

In each polarizing plate sample, five polarizing plates with a size of 25×25 cm² were cut. Two polarizing plates with a size of 30×30 cm² arranged in a crossed Nicol state were separately prepared, and each of the above five polarizing-plates was inserted between the polarizing plates arranged in a crossed Nicol state. Thus, foreign materials of the plate sample were observed as luminescent spots in a crossed Nicol state. The number of luminescent spots was counted in each of the five polarizing plates, and the average number was computed. The polarizing plate sample was evaluated according to the following criteria:

A: No luminescent spots were observed.

B: One to five small luminescent spots were observed.

C: Six to fifty small luminescent spots were observed.

D: Fifty one to ninety nine small luminescent spots were

E: Not less than one hundred small luminescent spots were observed.

The results are shown in Table 2.

TABLE 2

| | Cellulose ester film | | | | | | Polarizing plate | |
|---|---|---|---|---|---|---|---|---|
| Sample No. | Retardation (nm) | Rate of water absorption (wt %) | Dimensional stability (%) * | ** | UV absorption property (%) | Foreign materials or stains (rating) | Durability (rating) | Foreign materials or defects (rating) |
| 21 | 3 | 1.3 | −0.08 | −0.04 | — | B | A | B |
| 22 | 3 | 1.3 | −0.06 | −0.04 | 90 | B | A | B |
| 23 | 6 | 1.4 | −0.10 | −0.08 | 100 | B | A | B |
| 24 | 8 | 1.6 | −0.35 | −0.20 | — | A | A | A |
| 25 | 4 | 1.2 | −0.08 | −0.11 | — | B | A | B |
| 26 | 4 | 1.5 | −0.40 | −0.25 | — | A | A | A |
| 27 | 3 | 1.1 | −0.02 | −0.02 | 99 | B | A | B |
| 28 | 2 | 1.2 | −0.05 | −0.04 | — | B | A | B |
| 29 | 3 | 1.3 | −0.04 | −0.03 | 98 | B | A | B |
| 30 | 3 | 1.5 | −0.15 | −0.12 | 99 | A | A | A |
| 31 | 2 | 1.3 | −0.21 | −0.18 | 99 | B | A | B |
| 32 | 6 | 1.4 | −0.30 | −0.25 | — | B | A | B |
| 33 | 6 | 1.4 | −0.31 | −0.24 | 97 | B | A | B |
| 34 | 7 | 1.7 | −0.42 | −0.35 | — | A | A | A |
| 35 | 7 | 1.6 | −0.30 | −0.22 | 97 | A | B | A |
| 36 | 3 | 1.5 | −0.39 | −0.30 | — | A | B | A |
| 37 | 5 | 1.4 | −0.07 | −0.05 | — | A | A | A |
| 38 | 7 | 1.3 | −0.08 | −0.07 | — | A | A | A |
| 39 | 8 | 2.5 | −0.56 | −0.55 | 67 | D | D | D |
| 40 | 50 | 2.8 | −0.81 | −0.80 | — | C | E | C |
| 41 | *** | — | — | — | — | — | — | — |
| 42 | *** | — | — | — | — | — | — | — |
| 43 | 50 | 2.8 | −0.85 | −0.85 | 58 | C | E | C |

In Table 2, symbol "*" represents "in the longitudinal direction", and symbol "" represents "in the transverse direction". Symbol "*" shows that no film was formed.

As is apparent from Table 2 above, the cellulose ester film of the invention, prepared by casting on a support a dope containing an ethylenically unsaturated monomer or an epoxy-containing compound and a photopolymerization initiator to form a web and irradiating the web to cause photopolymerization and produce a polymer or by casting on a support a dope containing a polymer in advance to form a web and drying the web, provides excellent retardation, reduced water absorption at high humidity, and excellent dimensional stability. The cellulose ester film of the invention used in polarizing plates provides excellent durability even at high temperature and high humidity.

Since the cellulose ester film of the invention contains no low molecular weight plasticizers, low molecular weight. UV absorbents nor low molecular weight anti-static agents, there are no foreign materials or stains produced on the film due to crystallization or volatilization. Further, in the cellulose ester film of the invention, the UV absorbing polymers or antistatic polymers contained in the film do not emerge from the film, and therefore, foreign materials or stains on the film are extremely reduced. With respect to UV absorption, the UV absorbing polymer in an amount smaller than that of a low molecular weight UV absorbent has proved to show effects equal to or better than those of the low molecular weight UV absorbent. With respect to an antistatic property, water absorption of the film of the invention is a little higher due to the presence of the hygroscopic group, but water absorption is reduced as compared with the film containing a low molecular weight antistatic agent. The cellulose ester film of the invention provides an excellent anti-static property as compared to the film containing a lower molecular weight antistatic agent, resulting in extremely reduced foreign materials stains or defects. It has been found that with respect to the ethylenically unsaturated monomer constituting the polymer in the invention, the vinyl ester monomers are a little better in various characteristics than the acrylic ester monomers.

EFFECTS OF THE INVENTION

The present invention provides a cellulose ester film with a low moisture vapor transmittance for use in a polarizing plate, which does not deteriorate performance of a polarizing film of the polarizing plate even at high temperature and high humidity. The present invention further provides a cellulose ester film with an excellent retention property, which minimizes volatilization or precipitation of additives during the film manufacture and does not result in contamination of the film manufacture lines or the film itself.

Disclosed embodiment can be varied by a skilled person without departing from the spirits and scope of the invention.

What is claimed is:

1. A method for preparing a cellulose ester film comprising a cellulose ester and a polymer prepared by polymerizing at least one ethylenically unsaturated monomer selected from the group consisting of vinyl esters and acrylic esters, the method comprising the steps of:
    casting a cellulose ester dope containing the monomer and a photopolymerization initiator on a metal support to form a cellulose ester web;
    applying light to the web to initiate photopolymerization, whereby the polymer is produced in the web;
    peeling the web from the metal support; and
    drying the web in a drying apparatus to obtain a cellulose ester film,
    wherein the polymer has a weight average molecular weight of not more than 5,000, and wherein the rate of mass chance of the cellulose ester film is not more than 2%, the rate of mass change being represented by the following formula:

Rate of mass change (%)=$(|y-z|/y) \times 100$ wherein y is the weight of the cellulose ester film measured at 23±3° C. and at 55±3% RH, and z is the weight of the cellulose ester film measured at 23±3° C. and at 55±3% RH after the film has been stored at 80±3° C. and at 90±3% RH for 48 hours, and then stored at 23±3° C. and at 55±3% RH for 24 hours.

2. The method of claim 1, wherein the polymer has a weight average molecular weight of not more than 5,000.

3. The method of claim 1, wherein the cellulose ester dope further contains fine particles having an average particle diameter of 0.01 to 1.0 µm.

4. The method of claim 1, wherein the drying apparatus comprises a tenter.

5. The method of claim 1, wherein the polymer contains an alkyl acrylate monomer in an amount of not less then 30 weight % or an alkyl methacrylate monomer in an amount of not less than 30 weight %.

6. The method of claim 5, wherein the polymer contains a methyl acrylate monomer in an amount of not less than 30 weight %.

7. The method of claim 1, wherein the polymer has a water solubilizing group.

8. The method of claim 7, wherein the water solubilizing group is a hydroxyl group.

9. The method of claim 1, wherein the content of said polymer in the cellulose ester film is 0.5 to 30 weight % based on the cellulose ester film.

10. The method of claim 1, wherein the thickness of the cellulose ester film is 30 to 150 µm.

11. The method of claim 3, wherein the fine particle content of the film is 0.005 to 0.3 weight %.

12. The method of claim 3, wherein the fine particles are silicon dioxide particles.

* * * * *